US011072524B2

(12) United States Patent
Kusakabe et al.

(10) Patent No.: US 11,072,524 B2
(45) Date of Patent: Jul. 27, 2021

(54) CARBON-BASED HYDROGEN STORAGE MATERIAL HAVING AUTOCATALYTIC CAPABILITY, PRODUCTION METHOD THEREOF, AND HYDROGEN ADSORBING—STORING METHOD, HYDROGEN RELEASING METHOD, AND HYDROGEN ADSORPTION—STORAGE DEVICE USING THEREOF

(71) Applicants: Osaka University, Suita (JP); Fukuoka Institute of Technology, Fukuoka (JP); Hosei University, Tokyo (JP)

(72) Inventors: Koichi Kusakabe, Suita (JP); Gagus Ketut Sunnardianto, Suita (JP); Toshiaki Enoki, Kawaguchi (JP); Isao Maruyama, Fukuoka (JP); Kazuyuki Takai, Tokyo (JP)

(73) Assignees: Osaka University, Suita (JP); Fukuoka Institute of Technology, Fukuoka (JP); Hosei University, Tokyo (JP)

( * ) Notice: Subject to any disclaimer, the term of this patent is extended or adjusted under 35 U.S.C. 154(b) by 160 days.

(21) Appl. No.: 16/288,252

(22) Filed: Feb. 28, 2019

(65) Prior Publication Data
US 2019/0233282 A1 Aug. 1, 2019

Related U.S. Application Data

(63) Continuation of application No. PCT/JP2017/031325, filed on Aug. 31, 2017.

(30) Foreign Application Priority Data

Aug. 31, 2016 (JP) .............................. JP2016-169558

(51) Int. Cl.
C01B 3/00 (2006.01)
F17C 11/00 (2006.01)
(Continued)

(52) U.S. Cl.
CPC ........ *C01B 3/0021* (2013.01); *B01D 53/0438* (2013.01); *C01B 3/00* (2013.01);
(Continued)

(58) Field of Classification Search
CPC .......... B01D 53/0438; B01D 2253/102; B01D 2257/108; B01D 2259/40088;
(Continued)

(56) References Cited

U.S. PATENT DOCUMENTS 7,094,276 B2 * 8/2006 Kojima ................... B01J 20/02
206/0.7
8,147,599 B2 * 4/2012 McAlister ................ B32B 3/12
96/154
(Continued)

FOREIGN PATENT DOCUMENTS

JP 2004-526659 A 9/2004
JP 2006-35174 A 2/2006
(Continued)

OTHER PUBLICATIONS

Ao, S.M. et al., "The electric field as a novel switch for uptake/release of hydrogen of hydrogen for storage in nitrogen doped graphene," Phys. Chem. Chem. Phys., 2012, 14, pp. 1463-1467.
(Continued)

*Primary Examiner* — Frank M Lawrence, Jr.
(74) *Attorney, Agent, or Firm* — Faegre Drinker Biddle & Reath LLP

(57) ABSTRACT

The objective of the present invention is to provide a carbon-based hydrogen storage material having an autocatalytic capability and an atomic vacancy, wherein the hydrogen storage is a hydrocarbon compound which produces a non-endothermic release or an exothermic release of hydrogen adsorbed in the compound. In addition, the present invention provides a method of manufacturing the material
(Continued)

comprising: preparing a hydrocarbon compound as the raw material of the carbon-based hydrogen storage material; setting the raw material in a container having a predetermined gas partial pressure; producing the hydrocarbon compound by ion beam irradiation of the raw material; performing annealing treatment under the predetermined conditions; and exposing the product to the hydrogen under the predetermined conditions, wherein the product is a hydrogen storage hydrocarbon compound producing a non-endothermic or an exothermic release of hydrogen adsorbed thereto with autocatalysis activity.

19 Claims, 18 Drawing Sheets

(51) Int. Cl.
*C01B 32/194* (2017.01)
*B01D 53/04* (2006.01)
(52) U.S. Cl.
CPC ............ *C01B 32/194* (2017.08); *F17C 11/00* (2013.01); *F17C 11/005* (2013.01); *B01D 2253/102* (2013.01); *B01D 2257/108* (2013.01); *B01D 2259/40088* (2013.01); *Y02P 90/45* (2015.11)
(58) Field of Classification Search
CPC ..... Y02P 90/45; C01B 32/184; C01B 32/194; C01B 3/00; C01B 3/0021; F17C 11/00; F17C 11/005
USPC ................ 95/90, 900; 96/108, 146; 206/0.7; 502/526, 401
See application file for complete search history.

(56) References Cited

U.S. PATENT DOCUMENTS

| | | |
|---|---|---|
| 2005/0016866 A1 | 1/2005 | Kramer et al. |
| 2007/0092437 A1 | 4/2007 | Kwon et al. |
| 2013/0249147 A1 | 9/2013 | Bedworth |
| 2014/0011034 A1* | 1/2014 | Majumder ............ C09K 8/805 428/406 |
| 2015/0333124 A1 | 11/2015 | Hintermann et al. |
| 2017/0166496 A1 | 6/2017 | Imagawa et al. |

FOREIGN PATENT DOCUMENTS

| | | |
|---|---|---|
| JP | 2010-116361 A | 5/2010 |
| JP | 2010-254491 A | 11/2010 |
| JP | 2015-516357 A | 6/2015 |
| JP | 2015-145347 A | 8/2015 |
| JP | 2016-510295 A | 4/2016 |
| JP | 2016-94948 A | 5/2016 |

OTHER PUBLICATIONS

Elton, Daniel C., "Energy Barriers and Rates—Transition State Theory for Physicists," Oct. 12, 2013, 9 pages.
Enoki, Toshiaki et. al., "Hydrogen in romatics. III. Chemisorption of hydrogen in graphite-alkali metal intercalation compounds," J. Chem. Phys. 78(4), 1983, pp. 2017-2029.
Ziatdinov, Maxim et al., "Direct imaging of monovacancy-hydrogen complexes in a single graphitic layer," Phycial Review B 89, 155405 (2014) 155405-1-155405-15.
International Preliminary Report on Patentability dated May 1, 2018 for PCT/JP2017/031325, including English language translation.
International Search Report / Written Opinon dated Nov. 7, 2017 for PCT/JP2017/031325.

* cited by examiner

Fig. 1
(A)
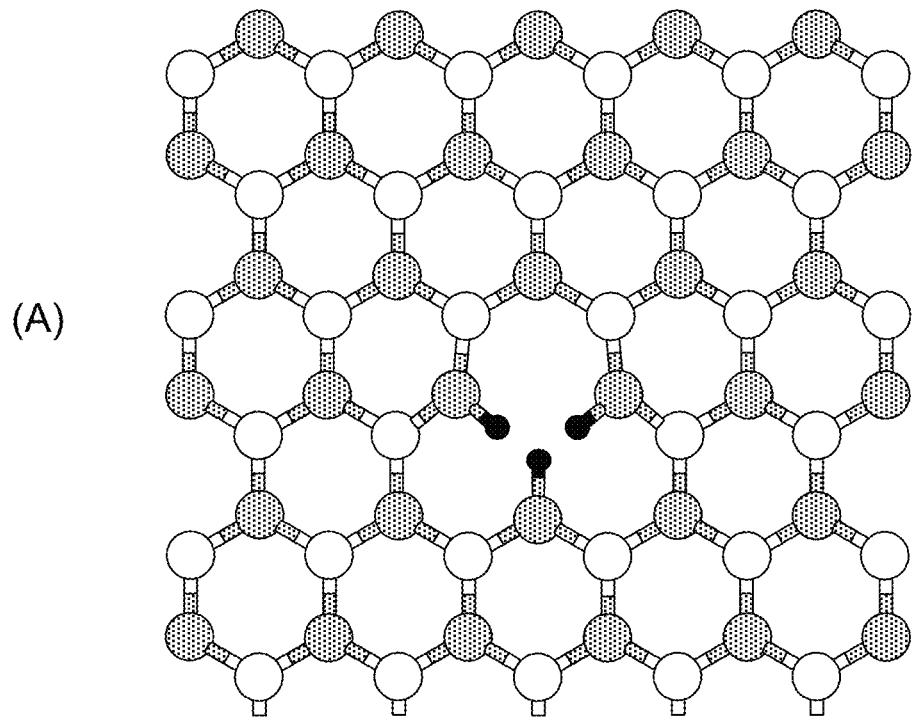
(B)
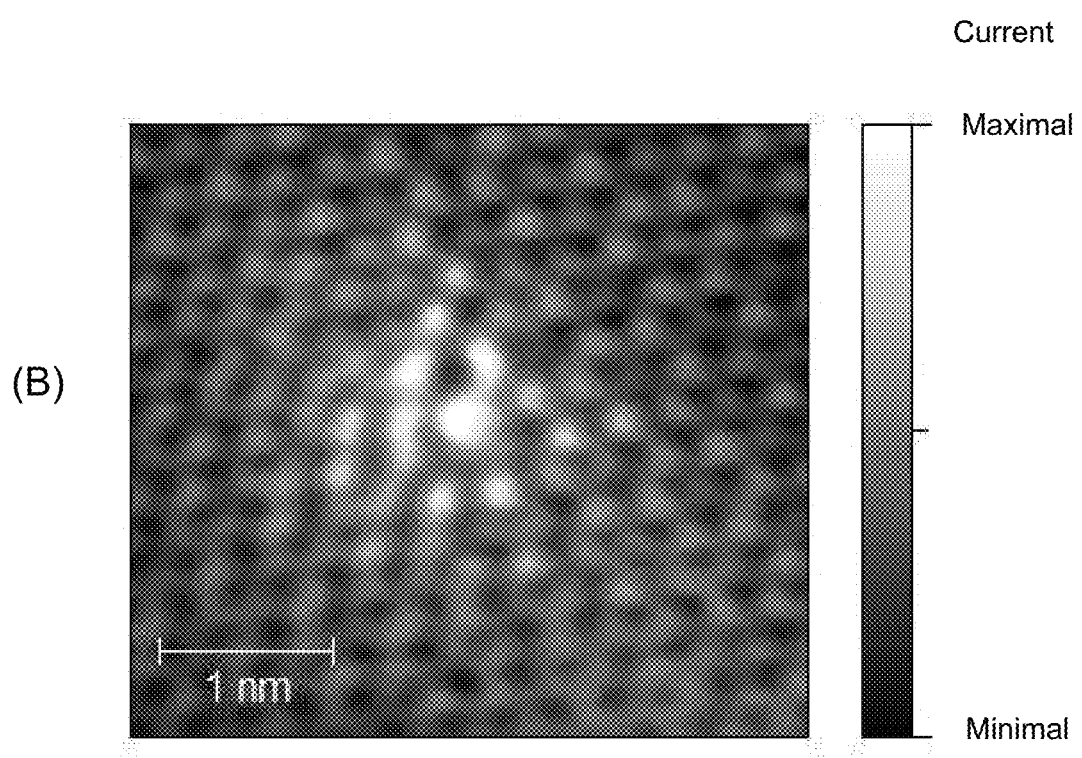

Fig. 2
(A)
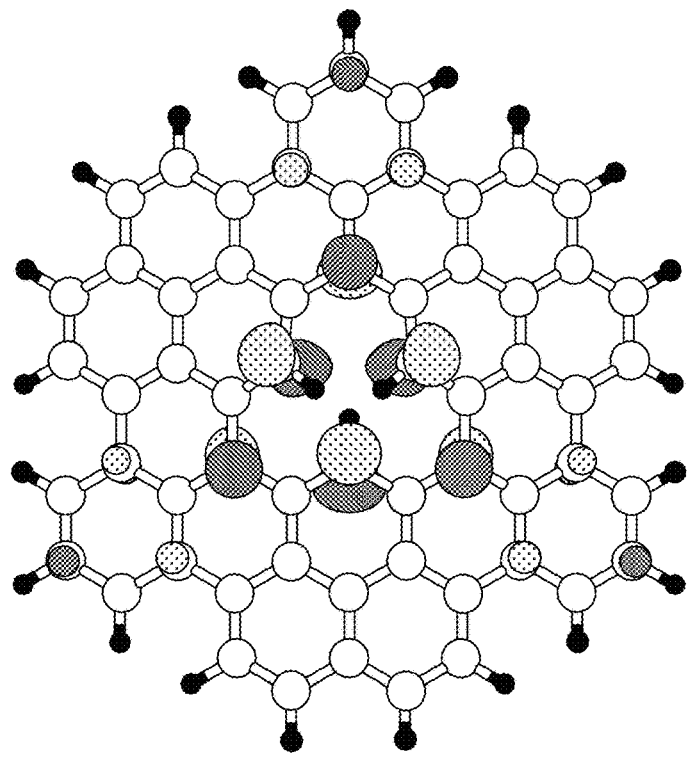
(B)
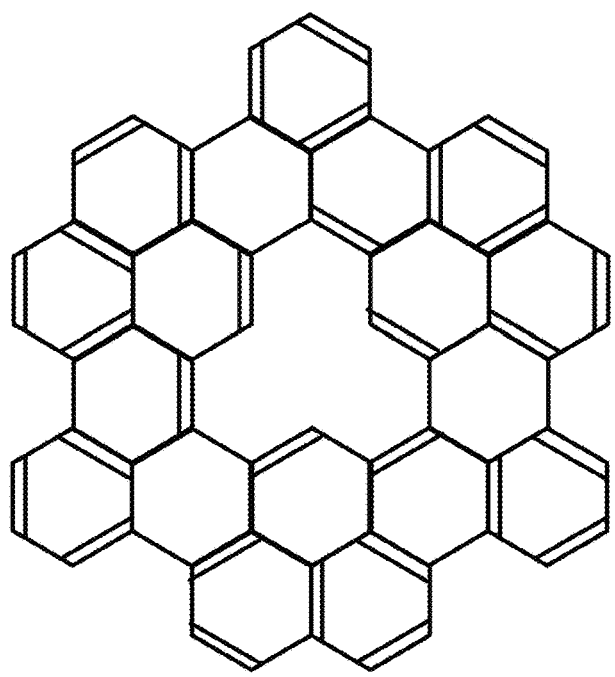

CARBON-BASED HYDROGEN STORAGE MATERIAL HAVING AUTOCATALYTIC CAPABILITY, PRODUCTION METHOD THEREOF, AND HYDROGEN ADSORBING—STORING METHOD, HYDROGEN RELEASING METHOD, AND HYDROGEN ADSORPTION—STORAGE DEVICE USING THEREOF

CROSS REFERENCE TO RELATED APPLICATIONS

This application is a Bypass Continuation Application of International Application No. PCT/JP2017/031325, filed Aug. 31, 2017, and which claims benefit of Japanese Patent Application No. 2016-169558 filed Aug. 31, 2016.

TECHNICAL FIELD

The present invention relates to carbon-based hydrogen storage material having autocatalytic capability, a hydrogen adsorbing-storing method using thereof, a releasing method of adsorbed hydrogen in the material, and hydrogen adsorption-storage device using the material. In detail, the present invention relates to the carbon-based hydrogen storage material which has both of a particular atomic defect and autocatalytic capability without addition of an alkaline metal and the like, and a producing method thereof. The present invention relates to the hydrogen releasing method adsorbed in the material, and hydrogen adsorption-storage device using the material.

BACKGROUND ART

The modem life highly depends on electrical energy. The electrical energy is supplied by using mainly fossil fuel such as petroleum, atomic energy and the like. However, in present position, both of petroleum and nuclear fuel are depending on import thereof.

On the other hand, it is known that carbon dioxide emission by using such fossil fuel causes greenhouse effect which leads to environmental issues such as global warming and the like. Also, growing energy demands in developing countries or destabilizing political situation in particular area make production amount and cost of petroleum.

Under such circumstances, hydrogen attracts attentions as the energy source that does not emit carbon dioxide. Hydrogen is provided as bi-products in a production process of organic industrial products utilizing chemical reactions, and it has merits such that it is the fuel to maximize the fuel cell capability, it does not generate carbon dioxide at all and the like. However, since hydrogen has high reactivity, both of the technique to transport or store ensuring the safety and that to take out stored hydrogen efficiently are required. As such techniques, for example, it is proposed as another technique that gaseous or liquid hydrogen is filled into a hydrogen tank to be transported thereafter (see patent document 1, which is referred to as the "prior art 1"). Also, another technique that hydride is formed from hydrogen and then it is liquefied or solidified (see patent document 1, which is referred to as the "prior art 2").

Conventionally, a variety of the hydrogen storage material, to which molecular or atomic hydrogen are adsorbed or desorbed utilizing adsorption-desorption reaction, is developed. As application ways of the hydrogen storage material, applied research to develop the fuel cell is studied, wherein the fuel cell is employed as power supplies for automobiles, power supplies for commercial or business use, or power supply for house-held use and the like. Also, in recent years, technologies directed to construct hydrogen energy based society, which utilizes hydrogen as an energy source, are rapidly progressed.

As the carbon material, there are, for example, graphite, activated charcoal, graphene, nano-graphene, aromatic hydrocarbons, polycyclic aromatic hydrocarbons, carbon nano-tube, fullerenes and the like. There exist hydrogen adsorption materials having an excellent hydrogen storage capability, which is sometimes referred to as the "hydrogen storage material", when the carbon material as described above is employed to synthesize a graphite intercalation compound by adding alkaline metal into graphite. Also, there is a realized example as a practical material (see, the non-patent literature 1, hereinbelow, it is referred to as the "prior art 3").

There is the technique to utilize the compound, an organic hydride, which is synthesized from the organic molecules such as toluene and the like by hydrogenation (see, the patent literature 3, hereinbelow, it is referred to as the "prior art 4").

Further, as the material used for liquefying or solidifying hydride, a variety of the carbon material including composite carbon material is studied. It is known that among such carbon based materials, when the material having rather broad planar structure of graphene, for example, hydrogenated graphene, graphene, graphone and the like, is exposed to the atomic hydrogen, the atomic hydrogen constitutes stable adsorption state, which has rather large heat of reaction, on-top type adsorption structure (see, the non-patent literature 2, hereinbelow, it is referred to as the "prior art 5").

PRIOR ART DOCUMENTS

Patent Literature

[Patent Literature 1] JP 2016-94948 A
[Patent Literature 2] JP2010-254491A
[Patent Literature 3] JP 2015-145347A Non-Patent Literature

[Non-patent Literature 1] "Hydrogen in aromatics. III. Chemisorption of hydrogen in graphite-alkali metal intercalation compounds", T. Enoki, M. Sano, and H. Inokuchi, The Journal of Chemical Physics 78, 2017 (1083).
[Non-patent Literature 2] "Direct imaging of monovacancy-hydrogen complexes in a single graphitic layer", M. Ziatodinov, S. Fujii, K. Kusakabe, M. Kiguchi, T. Mori, and T. Enoki, Physical Review B, 89, 155405 (2014)

SUMMARY OF INVENTION

Problem to be Solved by the Invention

The prior art 1 is an art to fulfill the hydrogen tank with gaseous hydrogen and it is excellent from the view point that the weight increase of the tank is caused by that of the tank itself. However, in order to charge hydrogen in high density, pressure increment is unavoidable. As a result, since oxygen in air reacts with hydrogen, there is the problem that the safety cannot be ensures when a vehicle is used for transportation of hydrogen and it is involved in a traffic accident therein. Also, there is the problem that cost becomes higher, because boiling loss is unavoidable.

Prior art 2 is the excellent technique from the view point that it enables to charge higher volume of hydride in the tank compared to that of gaseous state, when hydride is liquefied or solidified. However, there are the problems that cooling of the entire of the container is required in long transport distance; and stored hydrogen is not efficiently taken out.

Prior art 3 is the excellent technique in the view point of hydrogen storage capability. However, in most of cases, there is the problem that it is impossible to construct the material having a lower energy barrier structure without increase of the activity caused by metal catalyst and the like. Here, the term, "the lower activation barrier" is defined as the activation barrier having a base structure composed of sole carbon material, catalyst capability, and not over than 1.5 eV. This is the same as that in dehydrogenation reaction of organic hydride provided as the practical material. There are the same problems in the case of hydrogenated graphene such as graphane, graphone and the like is utilized.

Prior art 4 is the excellent technique from the view-points that the organic hydride to be charged is synthesized in a factory wherein hydrogen is generated; and the liquefied or organic hydride are stable and highly safety. However, since it requires energy for the step of taking out hydrogen stored in the organic hydride, this requires large scale facilities, for example, for taking out hydrogen stored in the organic hydride.

Therefore, there are strong social needs for storing and transporting hydride safely and efficiently, and further for taking out stored hydrogen efficiently by convenient operations.

Prior art 5 is the excellent technique to adsorb hydrogen to the substance stably. However, there is the problem that it requires to go beyond the activation barrier in the more than 1.5 eV in elimination reaction for releasing molecular hydrogen from the graphene surface, on which on-top type adsorption structure is formed. The activation barrier of the eliminating reaction over than 1.5 eV requires higher energy for releasing hydrogen from the substance, and then it gives lower releasing efficiency of hydrogen, because of endothermic reaction.

The carbon-based material as that for hydrogen storing material has advantages such as: it has a possibility for densely charging hydrogen by utilizing layer structures particular to graphite-material; it has rather light structure; and it leads a way to remain expectations for convenient release of hydrogen from the hydride, maintaining the carbon against hydrogen ratio up to 1:1 at maximal.

However, even if the methods employing such materials, there is the problem that hydrogen is not stably adsorbed to hydrocarbon material solely composed of carbon and hydrogen. Also, it is not known that any materials which may maintain stably stored hydrogen at room temperature, and conveniently release hydrogen therefrom, being well controlled, under the temperature not over than 500° C.

Therefore, there is the strong need for the material composed of solely hydrocarbons, and having a lower activation barrier, namely, having excellent capabilities for storing and releasing of hydrogen.

Means for Solving the Problem

The present invention is completed under the above-mentioned circumstances. Namely, the purpose of the present invention is to provide both of the carbon-based hydrogen storing material having autocatalytic capability, and a method for producing thereof. Other purposes of the present invention are to provide a method for storing hydrogen by using thereof, a method for releasing hydrogen, and a device for storing hydrogen.

An aspect of the present invention is carbon-based hydrogen storage material having autocatalysis and atomic vacancies, being a hydrogen storage hydrocarbon compound producing a non-endothermic release or an exothermic release of hydrogen adsorbed in the compound. Here, the hydrogen storage hydrocarbon compound preferably consists of carbon and hydrogen, and the atomic vacancy preferably has a triply hydrogenated vacancy structure, a $V_{111}$ structure.

Also, the hydrogen storage hydrocarbon compound is preferably graphene or nanographene both having the $V_{111}$ structure. The dissociative adsorption activation barrier of the hydrogen storage hydrocarbon compound is preferably not over than 2 eV, and it is more preferably not over than 1.3 eV. Also, the hydrogen storage hydrocarbon compound preferably releases and/or adsorbs more than two hydrogen molecules per a catalytic active site.

Another aspect of the present invention is a method of manufacturing a carbon-based hydrogen storage material having atomic vacancies, comprising the steps of: preparing a hydrocarbon compound as a raw material of the carbon-based hydrogen storage material; setting the raw material in a container having a gas partial pressure from $0.5 \times 10^{-7}$ to $0.5 \times 10^{2}$ Pa, the gas having reaction activity with the hydrocarbon compound; producing the hydrocarbon compound having an atomic vacancy through an ion beam radiation to the hydrocarbon compound and annealing treatment of annealing time from 2 to 5 seconds at a temperature from 550 to 650° C.;

activating hydrogen in the container by use of a geometrically arc-shaped, filament, which is sometimes referred to as a "wire", having the temperature from 2000 to 2400° C.; and exposing the hydrocarbon compound having atomic vacancy to the activated hydrogen of exposing time from 5 to 10 seconds at a temperature from 800 to 1000° C., wherein the carbon-based hydrogen storage material having an atomic vacancy has autocatalysis and is a hydrogen storage hydrocarbon compound producing a non-endothermic release or an exothermic release of hydrogen adsorbed in the compound.

Here, the lower limit of the gas partial pressure is set to "$0.5 \times 10^{-7}$", because base pressure of the ultra high vacuum chamber, the pressure thereof prior to begin the experiment, is about $0.5 \times 10^{-8}$ Pa even in good condition so that predetermined conditions are set to $10^{-7}$ order. Also, the hydrocarbon compound is preferably graphene or its analog. Also, the ion beam is any one selected from the group consisting of an Argon ion beam, a Helium ion beam, a Krypton ion beam, and a Xenon ion beam. More preferably, it is an Argon ion beam, or a Helium ion beam, or both. The Argon ion beam is preferably irradiated for an irradiation time from 2 to 5 seconds at an irradiation power from 80 to 110 eV. Here, the desirable atomic vacancy structure is the $V_{111}$ structure.

Further aspect of the present invention is a method for storing hydrogen, comprising storing hydrogen to the carbon-based hydrogen storage material having the $V_{111}$ structure as catalytic capability point for adsorbing a hydrogen molecule and dissociated hydrogens therefrom as autocatalysis, being a hydrogen storage hydrocarbon compound producing a non-endothermic release or an exothermic release of hydrogen adsorbed in the compound for storing hydrogen at a pressure from $0.5 \times 10^{-3}$ to 15 MPa.

Another aspect of the present invention is a method for releasing hydrogen from a carbon-based hydrogen storage material, comprising heating the carbon-based hydrogen storage material having the $V_{111}$ structure as catalytic capability point for adsorbing a hydrogen molecule and dissociated hydrogens therefrom as autocatalysis, being a hydrogen storage hydrocarbon compound producing a non-endothermic release or an exothermic release of hydrogen adsorbed in the compound for storing hydrogen for releasing hydrogen at a pressure from $0.5 \times 10^{-3}$ to 15 MPa, the heating time being from $0.5 \times 10^{-9}$ to $0.5 \times 10^{3}$ seconds at a temperature from $0.5 \times 10^{2}$ to $0.5 \times 10^{3 \circ}$ C.

The other aspect of the present invention is a hydrogen storage device comprising: a container including a hydrogen storage element constituted by the carbon-based hydrogen storage material having the $V_{111}$ structure as catalytic capability point for adsorbing a hydrogen molecule and dissociated hydrogens therefrom as autocatalysis, being a hydrogen storage hydrocarbon compound producing a non-endothermic release or an exothermic release of hydrogen adsorbed in the compound and a hydrogen supply/outlet port, forming a sealed internal space in a condition that the hydrogen storage element is accommodated; a pressure control device controlling a pressure in the container; and a temperature control device controlling a temperature in the container, wherein the hydrogen supply/outlet port has a safety valve.

Here, it is preferable that hydrogen is stored in the hydrogen storage element through a temperature control of the container by the temperature control device in addition to a pressurization control by the pressure control device. Also, it is preferable that the pressure control device gives an atmospheric pressure in the container; and control the release of hydrogen from the carbon-based hydrogen storage material at the beginning of the release.

It is preferable that the pressure control device gives an atmospheric pressure in the container; and in addition, a heating controlling of an inside of the container starts a release of hydrogen adsorbed in the hydrogen storage device, and after the start of the release, the temperature control device controls a temperature of the inside of the container and also controls a speed of releasing hydrogen adsorbed in the carbon-based hydrogen storage material.

It is preferable that the hydrogen storage device comprises a voltage applying device applying a voltage to both sides of a plate member consisting of the carbon-based hydrogen storage material and substrate material, wherein the voltage applying device preferably reverse the polarity of the applied voltage.

The hydrogen storage device preferably comprises a vibration device vibrating the plate member. Also, it is preferable that the device comprises a lighting device accelerating the hydrogen release by irradiating the late member with one selected from a group consisting of an electromagnetic wave, a ultrasonic wave, and a particle beam.

Advantageous Effects of Invention

According to the present invention, the carbon-based hydrogen storage material having the following properties are provided: a lower dissociative adsorption activation barrier, and autocatalytic activity which is never given by other carbon-based materials.

Also, according to the present invention, the method for producing the material the carbon-based hydrogen storage material conveniently and efficiently is provided.

Furthermore, according to the present invention, the hydrogen storage device being used for storing and/or transporting thereof, because the device stores adsorbed hydrogen stably around the room temperature, release thereof quickly between the temperature of about 180° C. to about 1,500° C., is provided.

BRIEF DESCRIPTION OF DRAWINGS

FIG. 1 shows the structure of carbon-based material having the triply hydrogenated vacancy. (A) is a schematic solid figure of the material. (B) is an image obtained by using a high resolution scanning tunneling microscope.

FIG. 2 shows the structure of the molecule being employed as the hydrogenated material of the present invention. (A) is the schematic solid figure of the material, and (B) shows the chemical structure of the molecule.

FIG. 15 (d) is a topography line profile of STM, which across the atomic deficiency without passivation.

DESCRIPTION OF EMBODIMENTS

Figure 3:
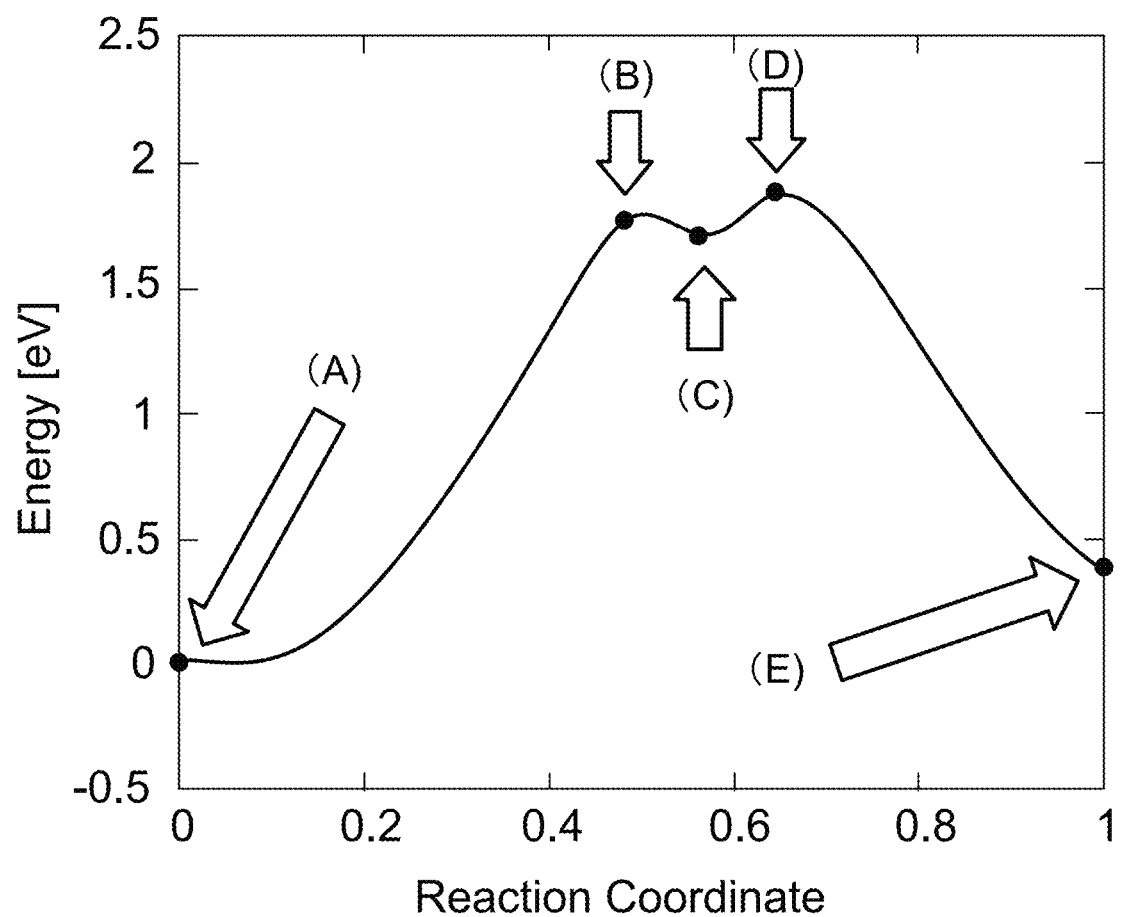
FIG. 3 is a graph showing a surface diffusion reaction process of hydrogen from quadruply hydrogenated vacancy structure which forms the triply hydrogenated vacancy structure. In the figure, (A) to (E) shows transition states of atoms included in the carbon material.

Hereinafter, various embodiments will be described in detail with reference to FIGS. 1A-22. In the drawings, identical or corresponding parts are denoted by the same reference symbols.

1. Carbon-Based Hydrogen Storage Material Having an Atomic Vacancy (1) Characteristics and Structures of a Carbon-Based Hydrogen Storage Material Having an Atomic Vacancy According to the Present Invention The present invention relates to a carbon-based hydrogen storage material having an atomic vacancy. Hereinafter, this material may be referred to simply as "hydrogen storage material". The hydrogen storage material has characteristics both of (1) autocatalytic reaction, and (2) production of a non-endothermic release or an exothermic release of hydrogen adsorbed in the hydrogen storage hydrocarbon compound.

The hydrogen storage material according to the present invention consists of only carbon and hydrogen, and does not need to comprise a metal. The constitution is decided by the characteristics of the structure itself of the material which constitutes the hydrogen storage material. The reason of this constitution is described later. The hydrogen storage material according to the present invention preferably consists of graphene, nanographene, and other graphene molecule, which have an atomic vacancy. End of the graphene molecule has two kinds of both a zigzag-type structure and an armchair-type structure.

(2) Autocatalytic Capability of the Carbon-Based Hydrogen Storage Material According to the Present Invention.

The carbon-based hydrogen storage material having the atomic vacancy used in the present invention, is hydrogen storage hydrocarbon compound which consists of only carbon and hydrogen. The carbon-based hydrogen storage material having the atomic vacancy has a structure which produces local autocatalytic reaction. Hereinafter, this structure may be referred to as "autocatalytic structure". Such an autocatalytic structure can be a triply hydrogenated vacancy structure which locally exists in the various kinds of carbon materials, for example. These carbon materials comprise a hydrocarbon molecule such as compound having a graphene like structure, and a polycyclic aromatic molecule (refer to FIGS. 1A and 2A).

The following reaction is defined as "autocatalytic reaction". The term "hydrogen storage material" means material, which stores hydrogen. By activating the "hydrogen storage material," a local structure is induced in the material. Here, the storing and releasing of hydrogen is the reaction that the induced local structure of the material promotes dissociation of a hydrogen molecule on the material after adsorption of the hydrogen, and then promotes storing process by diffusing the dissociated hydrogen atoms to the other portion of the material when hydrogen molecule is stored. Also, the storing and releasing of hydrogen is the reaction that induces binding of stored hydrogen atoms and releasing of a hydrogen molecule when a hydrogen molecule is released. That is, "autocatalytic reaction" means that "hydrogen storage material" itself has a catalytic capability in a storing and releasing reaction of hydrogen.

In the above definition, the description "by activating" is used because a local structure that exists on a surface is a catalyst which produces both release of a hydrogen molecule and diffusion of a hydrogen atom (hereinafter, the local structure may be referred to as "local structure"). Also, this is because, on the assumption that a diffusion of an atomic hydrogen which is produced by diffusing toward another portion of a surface (hereinafter, another portion may be referred to as "inside portion") or by diffusing from the "inside portion" has a role of storing and releasing, "local structure" which can be regarded as an active site of "an autocatalytic reaction" is fabricated without using a metal. Such metal is, specifically, palladium and the like. In this disclosure, "autocatalytic capability" means catalytic capability, which give autocatalytic reaction, and has the same meaning with "autocatalytic function". Also, "autocatalytic structure" means a local structure of a hydrogen storage material which has autocatalytic capability.

Hereinafter, a relationship between the triply hydrogenated vacancy structure and catalytic capability will be explained. General "catalysis" means that a structure itself of catalysis remains unchanged before and after reaction, and catalysis has function that promotes activity of a whole chemical reaction. In this disclosure, graphene, nanographene, and related polycyclic aromatic compounds are called, collectively, as "graphene group".

Molecules of graphene and nanographene have a molecular structure of a honeycomb lattice like carbon frame made of $sp^2$ bonding, which means an atomic arrangement fabricated by a mutual bonding of carbon molecules. Hereinafter, this molecular structure is called as "graphene structure". In graphene structure, atomic vacancies can be induced at a certain potion. The atomic vacancy is a deficiency structure that one of carbon molecules, which originally should exist, is lost in a perfect structure of the honeycomb lattice like carbon frame.

The atomic vacancy can be fabricated by a deficiency inducing method by a sputtering method using sputtering gas such as ionized inert gas, and by a deficiency inducing method from a starting point of synthesize. The deficiency inducing method is the method which a carbon molecule is beaten out from the molecular frame by irradiation of sputtering ions. The deficiency inducing method is the method which a deficient arrangement is constitutively fabricated when synthesizing the molecules.

And, a triply hydrogenated vacancy ($V_{111}$) can be constituted by a reaction of atomic or molecular hydrogen in a condition in which an appropriate temperature and an appropriate temperature and hydrogen partial pressure are set for each of hydrogen state.

The triply hydrogenated vacancy ($V_{111}$) further can adsorb another hydrogen molecule, and thus a quintuply hydrogenated vacancy is produced immediately after the adsorption. At this production, an atomic bonding, which constitutes the hydrogen molecule before the reaction, is broken, a molecular storing and releasing is generated. In succession to this reaction, two hydrogen atoms in the five hydrogen atoms which constitutes the quintuply hydrogenated vacancy may cause "a surface diffusion reaction" (migration) so that these two hydrogen atoms can produce an adsorbing state to be adsorbed above a carbon atom in a developing graphene frame. Here, "migration" means a change of an adsorbing position so as to diffuse above the graphene frame. The triply hydrogenated vacancy is left as a result of migration of the two hydrogen atoms among the adsorbed hydrogen atoms.

After the triply hydrogenated vacancy is reproduced as a result of diffusion of the hydrogen atom, the storing and releasing reaction of the hydrogen molecule generates again by using the triply hydrogenated vacancy, and a successive molecular storing and releasing generates as a whole. That is, since the successive molecular storing and releasing can be produced on one graphene frame, the triply hydrogenated vacancy plausibly has catalytic capability related to the storing and releasing reaction of the hydrogen molecule.

When graphene group does not have an atomic vacancy, the group does not exhibit strong activity, that is, exhibits non-active characteristics toward an adsorption of hydrogen molecule. On the assumption that the atomic vacancy structure itself is a part of the graphene structure, this local atomic structure can be thought to be a functional group in a broad sense. By inducing the triply hydrogenated vacancy structure to graphene group in a manner shown above, molecular storing and releasing of the hydrogen molecule is promoted, and as a result, a lot of hydrogen can easily be adsorbed to the graphene frame.

The hydrogen releasing reaction, which is mediated by both the triply hydrogenated vacancy and the quintuply hydrogenated vacancy, is a reaction opposite to the hydrogen releasing reaction. That is, the migration, which occurs in an opposite direction, generates catalytic capability which promotes a chemical reaction that molecular hydrogen releases from graphene group having an adsorbed hydrogen atom through the hydrogenated atomic vacancy. In this generation, graphene group having adsorbed hydrogen atom becomes starting material i.e., "hydrogen-storing-state material", which adsorbs hydrogen atom. Also, the migration generates catalysis effect which, as a whole, promotes releasing of the hydrogen through the reaction in which the triply hydrogenated vacancy is generated from the quintuply hydrogenated vacancy by releasing hydrogen molecule.

A compound having a graphene structure is prepared so as to produce the above mentioned atomic vacancy by use of the sputtering method using the inert gas ion such as argon ion. The triply hydrogenated vacancy is produced by conducting generation of the atomic vacancy thereof and a successive hydrogen treatment in the compound. The material having the triply hydrogenated vacancy, which is produced through the above-mentioned method, has autocatalytic capability. The treatment that produces such a triply hydrogenated vacancy can be called as activating method of "autocatalytic capability".

In the embodiment, graphene is a two-dimensional-sheet material having a thickness of one carbon atom, and has a molecular structure of six-membered-ring (a honeycomb lattice like structure) made of $sp^2$ bonding carbon. In this disclosure, the honeycomb lattice like structure fabricated by a mutual bonding of the $sp^2$ bonding carbons (hereinafter, this structure may be called as "honeycomb structure"), will be described as local graphene like structure, when "honeycomb structure" exists in a carbon-based hydrogen storage material used in the embodiment of the present invention.

The local graphene like structure is made of twelve $sp^2$ bonding carbons as a minimum unit, and has the triply hydrogenated vacancy structure in the center. Such structure is $V_{111}$ structure (refer to FIG. 1A), an activation barrier for a hydrogen adsorbing reaction and/or a hydrogen releasing reaction, which will be explained later.

FIG. 1A is a View schematically illustrating an example of a microscope image of a hydrogen storage hydrocarbon compound having the autocatalytic structure. The microscope image is obtained by using a high resolution scanning tunneling microscope. The microscope image (FIG. 1B) indicates that the hydrocarbon compound includes a structure having atomic vacancy shown in FIG. 1A, thus supporting that a natural world has this kind of autocatalytic structure as a local structure.

The triply hydrogenated vacancy structure is theoretically identified and is supported by a theoretical simulation method. The theoretical simulation method can identify a route of the changing positions of carbon and hydrogen nucleuses on the reaction path, and definitely indicate that the reaction does not have an infinite reaction energy. The reaction path is definitely determined by identifying one of the paths that gives the upper limit of the activation barrier.

The theoretical calculation result indicates that a quadruple hydrogenated vacancy structure is produced by exposing the carbon-based compound having the atomic vacancy structure to the atomic hydrogen and molecular hydrogen. Also, the theoretical calculation result indicates that, through the exposure, a hydrogen make a surface diffusion to be diffused to a surface of the compound the graphene like structure, and that the surface diffusion produces the triply hydrogenated vacancy structure with a high selectivity.

The experimental result indicates that a triply hydrogenated vacancy and a quadruple hydrogenated vacancy exist together in the carbon-based material, and a diffused hydrogen exists on the surface of the carbon-based material. These theoretical and experimental indications clarify the synthetic method of the triply hydrogenated vacancy.

It is known that the hydrogen that is adsorbed in the carbon-based compound diffuses on the material surface. The energy barrier of the surface diffusion depends on the reaction route, and is said to be almost 1.5 to 1.7 eV. The reaction process is controlled by an external hydrogen partial pressure.

Table 1 is a table that gives transition times in which the hydrogen is released from the adsorption with carbon-based material at room temperature (300K), and the energy barrier (activation enthalpy ΔH, which may be "releasing activation enthalpy" hereinafter) for releasing from the adsorption (Refer to D. C. Elton, Energy Barriers and Rates-Transition State Theory for Physicists).

TABLE 1

| ΔH (kcal/mol) | Activation barrier ΔH (eV) | Transition time ($\tau_{1/2}$) |
|---|---|---|
| 5 | 0.22 | 30 nanoseconds |
| 10 | 0.43 | 2.60 microseconds |
| 15 | 0.65 | 12 millisecond |
| 20 | 0.86 | 57 seconds |
| 25 | 1.1 | 3.2 hours |
| 30 | 1.3 | 41 years |

Table 1 specifically indicates that the release reaction for ΔH=1.3 eV does not actually occur because the transition time is 41 years at room temperature, thus suggesting that a safe transport can be obtained. To the contrary, since the transition time is 57 seconds at 180° C. (500K) which is not listed in Table 1, it is indicated that a hydrogen gas easily generates.

Hereinafter, some embodiments of the hydrogen adsorbing/releasing reaction with various carbon-based material at room temperature will be explained with some embodiments. When toluene is used as an example of organic hydride, the hydrogen adsorbing/releasing reaction is represented by following Formula (1).

[Mathematical 1]

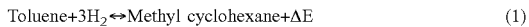

Toluene+3H$_2$↔Methyl cyclohexane+ΔE    (1)

In Formula (1), ΔE is the hydrogen releasing energy consumption (the change in the enthalpy, or the heat of reaction at constant volume). Formula (1) indicates that hydrogen molecule release from methyl cyclohexane is an endothermic reaction for E>0. Therefore, when the reaction defined in Formula (1) is conducted in a vacuum, this reaction does not actually occur when the reaction condition remains unchanged, because a measured ΔE value is 2.14 eV (the change in the enthalpy) and a calculation ΔE value (the heat of reaction at constant volume) through generalized gradient approximation (GGA) is 2.68 eV, which are both too high values for the reaction. When a small size plant having any reaction catalysis is not used for the reaction, methyl cyclohexane is obtained by storing hydrogen in toluene, but hydrogen cannot be extracted in the reverse reaction in Formula (1).

To the contrary, when graphene having the V$_{111}$ structure is reacted with hydrogen at room temperature, the hydrogen adsorbing/releasing reaction is represented by following Formula (2).

[Mathematical 2]

V$_{111}$/Graphene+H$_2$↔V$_{221}$/Graphene+ΔE    (2)

In Formula (2), a calculated ΔE is small value of 0.03 eV and the reaction in Formula (2) become almost reversible at a zero partial pressure, and thus, it is indicated that the adsorbed hydrogen can easily be extracted from graphene.

When a vacancy-centered hexagonal armchair nanographene (VANG) is reacted with hydrogen at room temperature, the hydrogen adsorbing/releasing reaction is represented by following Formula (3). The molecular structure of VANG is stable as illustrated in FIG. 2B, and VANG has almost the same reactive barrier with hydrogen molecule as that of graphene.

[Mathematical 3]

VANG+H$_2$↔Hydrogenated VANG+ΔE    (3)

In Formula (3), a ΔE value is −0.46 eV, which has an opposite sign compared with the reaction using organic hydride in Formula (1). It is guessed that a reaction from a hydrogenated state to a hydrogen desorbed state is exothermic. Thus, it shows that the autocatalytic capability explained later is given in Formula (3). The activation barrier in which a hydrogen desorbs from the carbon material is calculated to be almost 1.3 eV. This barrier value indicates that a safe transport can be obtained.

FIGS. 2A and 2B are views illustrating examples of polycyclic aromatic compounds having the triply hydrogenated vacancy (V$_{111}$) structure. In FIG. 2A, a hydrogen atom bonded with a periphery of V$_{111}$ and hydrogen diffused on the carbon which constitutes the honeycomb structure are illustrated separately.

Figure 4:
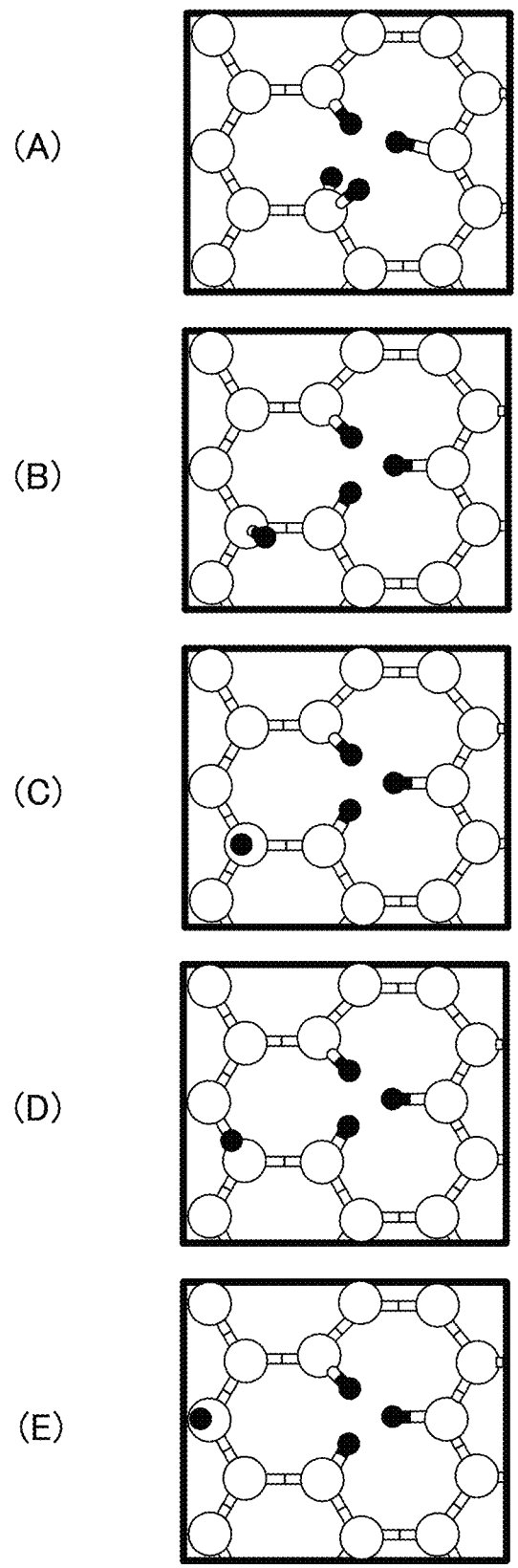
FIG. 4 is the schematic figure showing the transition states of the atom in the conditions shown in (A) to (E) in FIG. 4.

FIGS. 3 and 4 are the results simulating processes in which the triply hydrogenated vacancy is generated through a surface diffusion. The molecular structures of (A)-(E) are schematically illustrated in FIG. 4, thus corresponding to the energy states of (A)-(E) in FIG. 3, respectively. The energy states of (A)-(E) in FIG. 3 are simulated after hydrogen release to graphene having the triply hydrogenated vacancy. As shown in FIG. 4, a hydrogen atom firstly bonds to a carbon 1, secondly moves to another carbon 2 adjacent to carbon 1, and again, moves to another carbon 3, thereby generating hydrogen diffusion.

Figure 5:
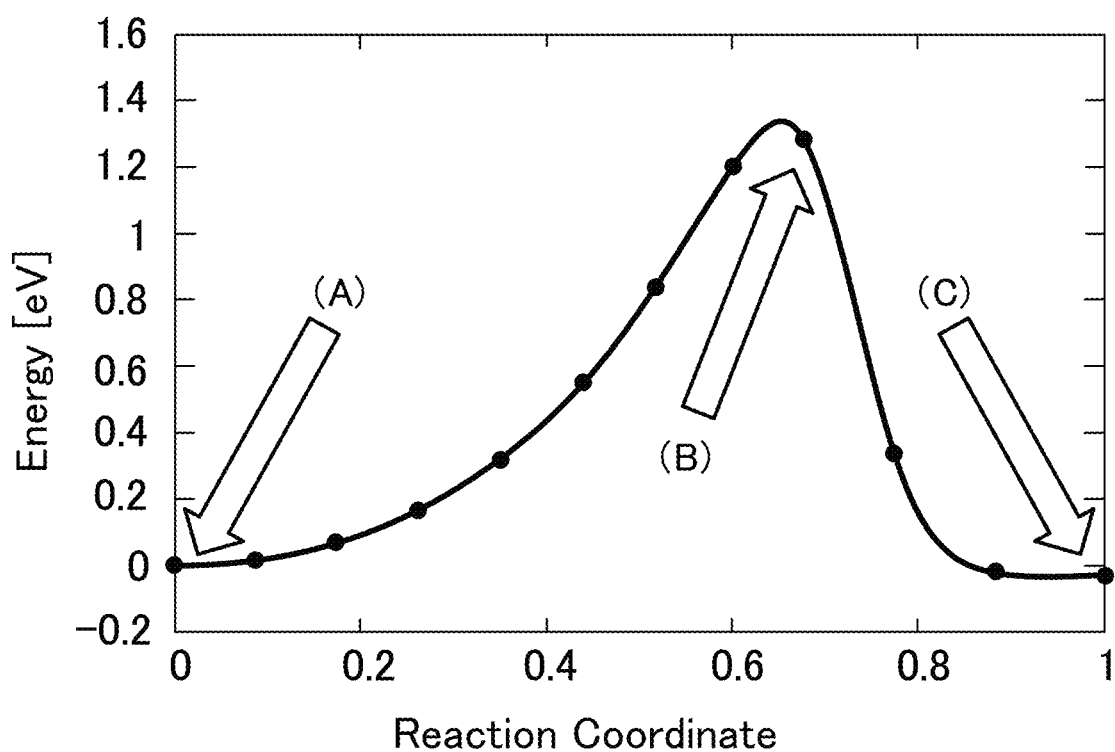
FIG. 5 is the graph showing an adsorption reaction process of the molecular hydrogen onto the triply hydrogenated vacancy. In the figure, (A) to (C) shows the transition states of atoms included in the carbon material.
Figure 6:
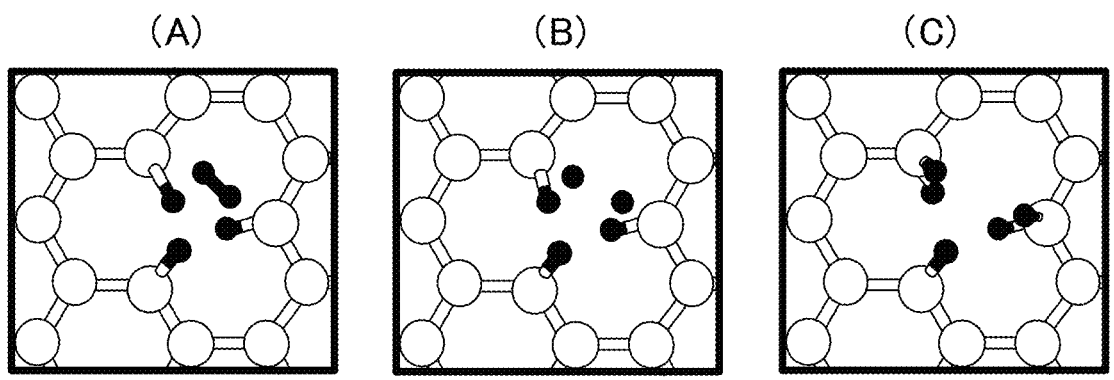
FIG. 6 is the schematic figure showing the transition states of atoms in the conditions shown in (A) to (C) in FIG. 5.
Figure 7:
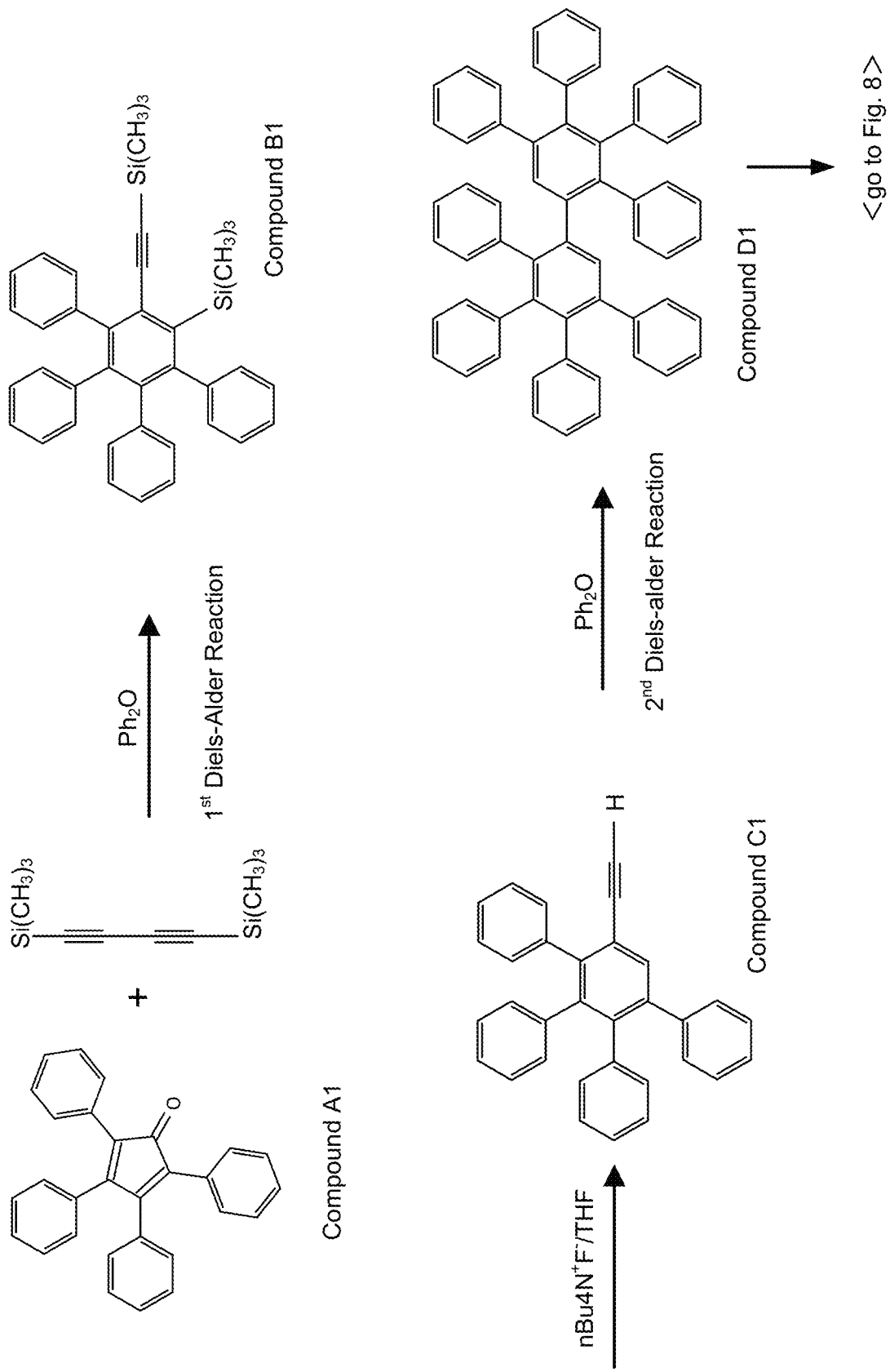
FIG. 7 shows the first half of a synthesis process of $C_{59}$ segment having $V_{111}$ structure therein.

Hereinafter, reaction processes of the molecular hydrogen adsorbing/releasing reaction on the carbon-based material having the triply hydrogenated vacancy will be explained. FIG. 5 are the results showing the molecular hydrogen adsorbing/releasing reaction on the carbon-based material having the triply hydrogenated vacancy as estimated values of the activation barrier. FIGS. 6A, 6B, and 6C are views schematically showing the processes in which the molecular hydrogen adsorption occurs in a condition of the activation barrier of (A), (B), and (C) shown in FIG. 5, respectively. FIGS. 6A, 6B, and 6C indicate that the quintuply hydrogenated vacancy is produced, and clarify that the activation barrier at the production is a little larger than 1.3 eV.

Also, It is indicated that a whole energy before and after the reaction adsorbing the hydrogen molecule slightly decreases, thus showing the energy difference of 0.03 eV. This result indicates that the adsorbing reaction is reversible because of very small energy for producing the quintuply hydrogenated vacancy.

In this disclosure, "autocatalytic reaction" means that a material structure itself which adsorbs hydrogen has catalytic capability before and after the reaction adsorbing hydrogen and induces a molecule releasing/adsorption with a migration of an atom comprising the material structure (surface diffusion reaction). Specifically, the following reaction occurs when the triply hydrogenated vacancy exists in the local graphene like material.

In the process that hydrogen molecule having a molecule is reacted with the triply hydrogenated vacancy structure (elementary process of reaction), hydrogen is adsorbed on the triply hydrogenated vacancy structure and the quintuply hydrogenated vacancy structure is formed in the carbon structure of the used carbon-based material, and after that, hydrogen diffuses on the carbon structure, thus being adsorbed in the carbon-based material. A reverse reaction of the adsorption reaction occurs when hydrogen is released. Because of the characteristics of "autocatalytic reaction", a structure having local catalytic capability is "recovered" even in a reaction product obtained after the hydrogen adsorption The carbon-based hydrogen storage material of the present invention can be manufactured by giving the autocatalytic capability to the carbon-based material in the following manner. Such a giving of the activity may be call as "activation".

2. Method for Manufacturing the Carbon-Based Hydrogen Storage Material

The carbon-based hydrogen storage material according to the present invention can be manufactured by a method comprising: (a1) a process preparing a raw material for the production; (a2) a process setting the raw material for the production in a container which are controlled to have a prescribed gas partial pressure; (a3) a process producing a hydrocarbon compound having the atomic vacancy; (a5) a process being exposed by atomic hydrogen.

In the process (a1), graphene and its analog (hereinafter, these can be called as "graphene group") is exemplified as the raw material for the production. Such graphene group can be synthesized in a following manner. First, graphene is synthesized chemically, and secondly, graphene is activated by using an apparatus which can conduct a sputtering treatment and an introduction of hydrogen.

Figure 11:
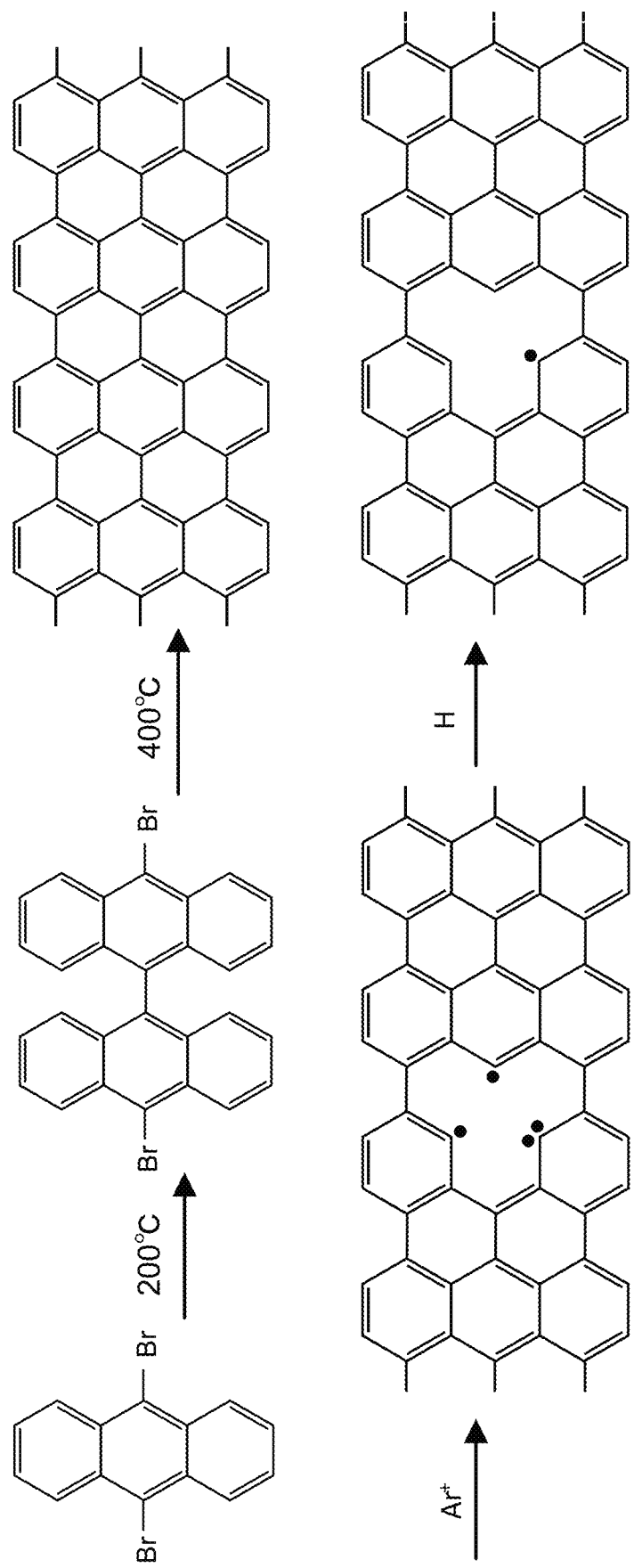
FIG. 11 shows the synthesis process of graphene having $V_{111}$ structure therein.
Figure 12:
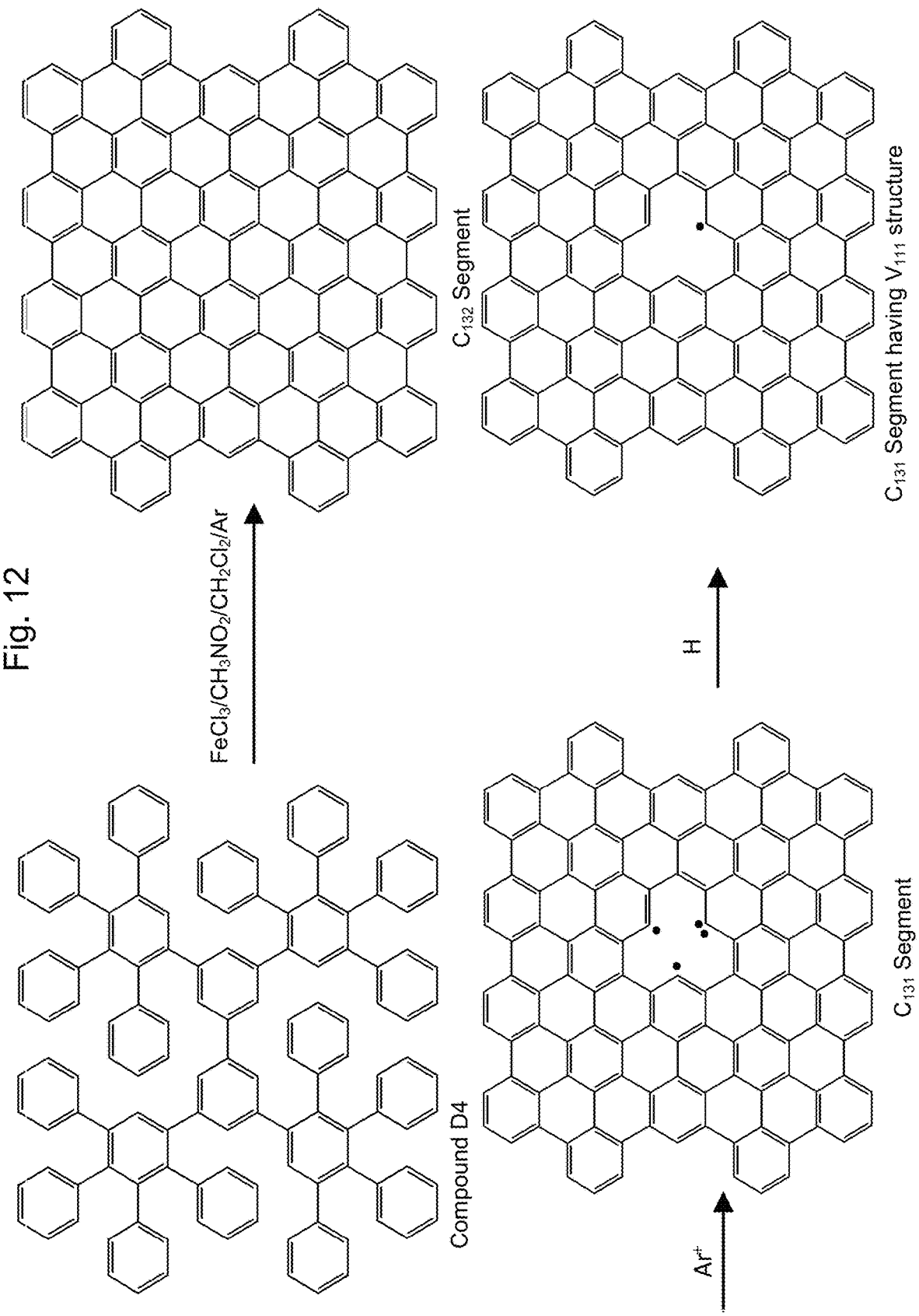
FIG. 12 shows the synthesis process of $C_{131}$ segment having $V_{111}$ structure therein.

As a detailed synthesizing method of nanographene, which is called as polycyclic aromatic hydrocarbon, i.e., "PAH", one example is illustrated in FIGS. 7-12. Some precursors such as Compound D1 in FIG. 7, Compound D2 in FIG. 9, and Compound D4 in FIG. 12 are synthesized, and a nanographene segment can be synthesized by use of a self-association of the obtained precursors (See reference 1: Acc. Chem. Res., 41, 511-520 (2008)). According to a reaction scheme shown in FIGS. 7 and 8, a $C_{60}$ segment 1 in an upper column in FIG. 8 can be synthesized from Compound A1 in FIG. 7 (See references such as reference 2: Angew. Chem. Int. Ed. 44, 5592 (2005), reference 3: Angew. Chem. Int. Ed. 37, 2696 (1998)). According to these synthesizing methods, a powder sample of the nanographene molecule is obtained by treating, in a gas such as argon, a sample through an oxidative cycloaddition reaction.

Compound B1 is obtained by a first Diels-Alder reaction using diphenyl ether. Both tetraphenylcyclopentadienone (product code: T1062, Tokyo Chemical Industry Co., Ltd) and 1,4-bis (trimethylsilyl)-1,3-butadiene (manufacturer code: 320-49913 or 324-49911, Wako Chemical Co., Ltd) are used as a starting material. Next, trimethylsilyl group in Compound B1 is removed by using $nBu_4N^+F^-$ in THF, and again, Compound D1 is obtained by a second Diels-Alder reaction using diphenyl ether (See FIG. 7).

Continuously, the $C_{60}$ segment 1 can be obtained through a dehydrocyclization reaction using $Cu(OSO_2CF_3)_2/AlCl_3/CS_2$. A $C_{59}$ segment 1 is obtained through sputtering of the $C_{60}$ segment 1 by use of argon ion. The $C_{59}$ segment 1 having the $V_{111}$ structure is obtained through hydrogen addition to the $C_{59}$ segment 1 (See FIG. 8).

Figure 9:
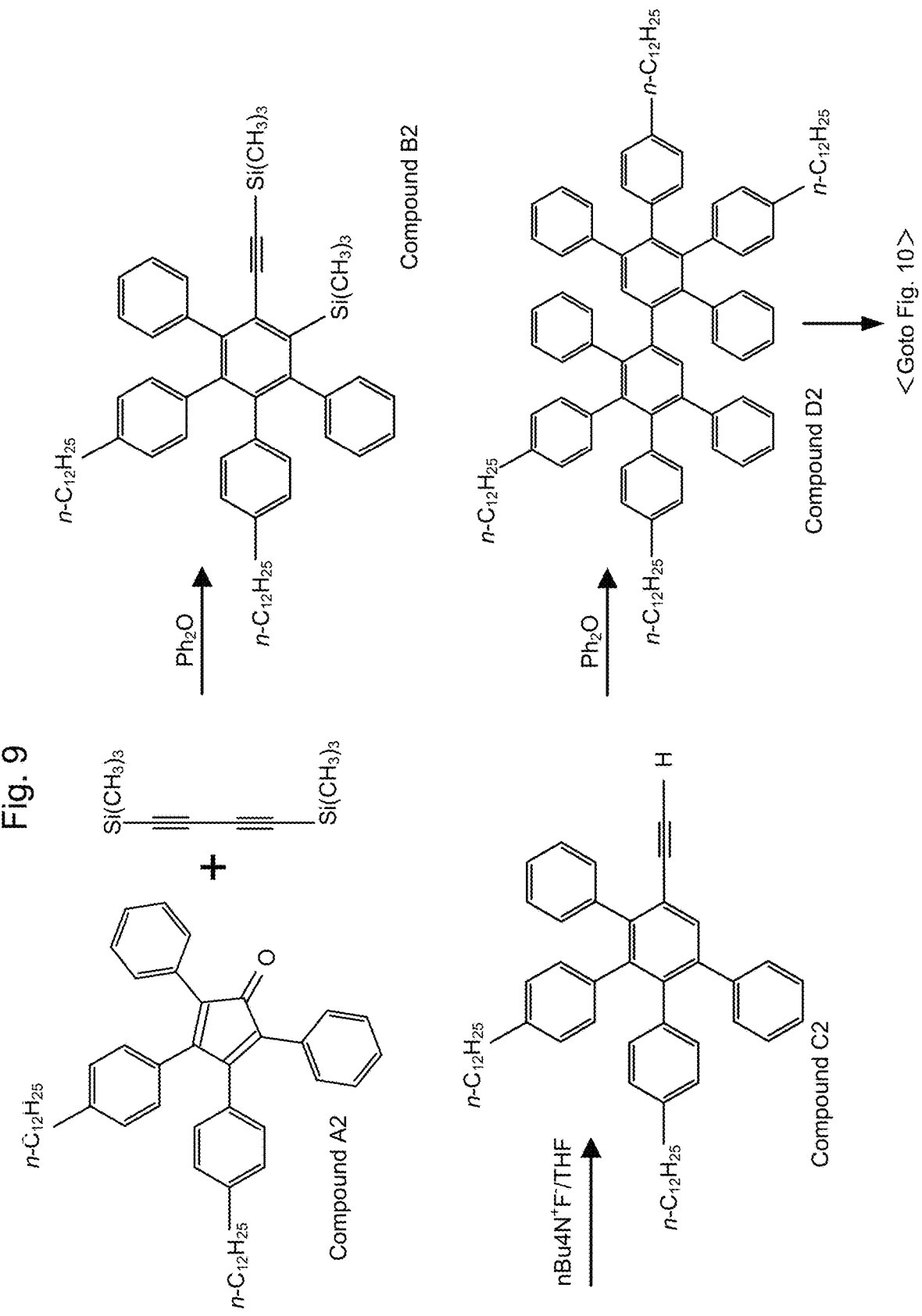
FIG. 9 shows the first half of the synthesis process of $n\text{-}C_{12}H_{25}$ segment having $V_{111}$ structure therein.
Figure 10:
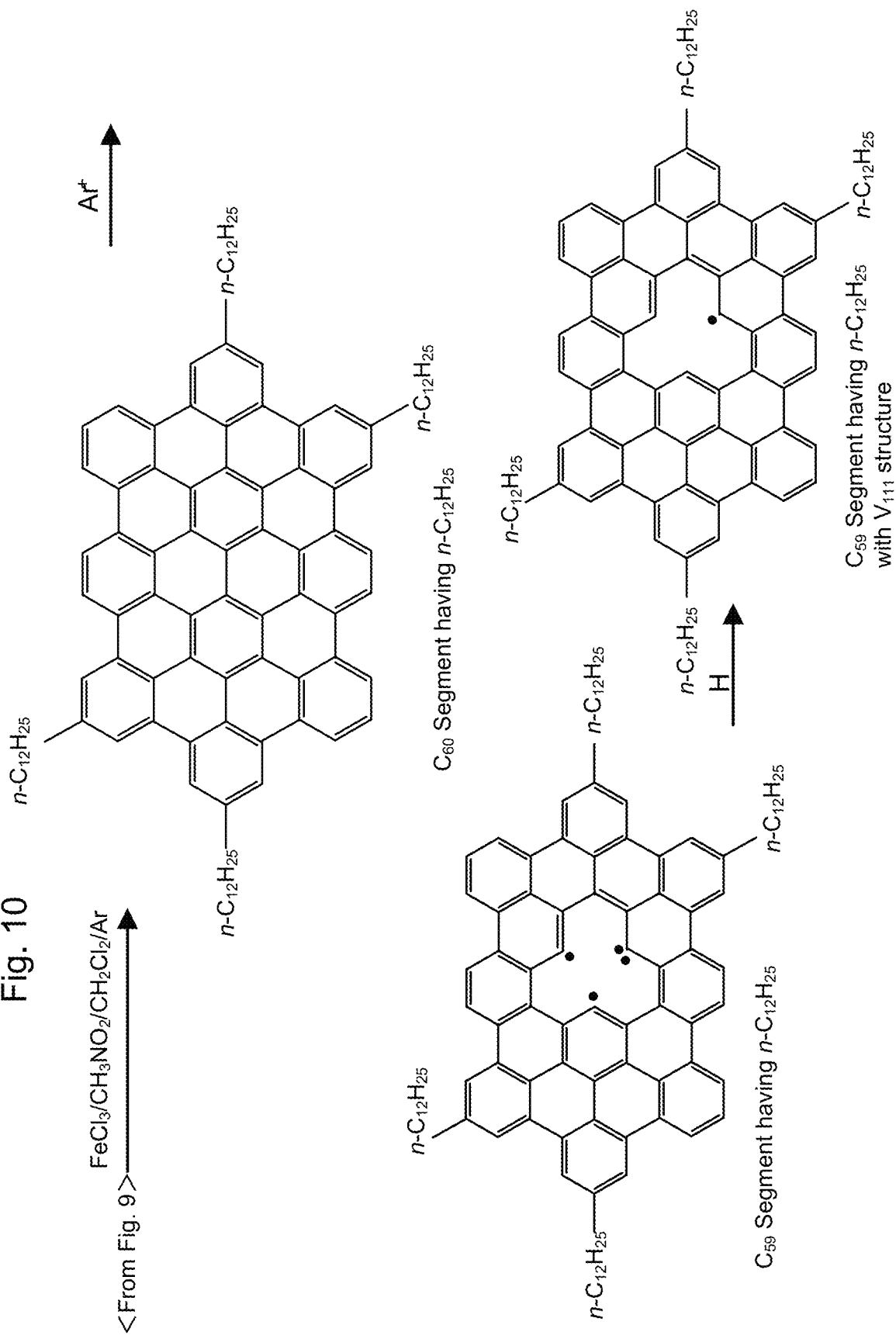
FIG. 10 shows the second half of the synthesis process of $n\text{-}C_{12}H_{25}$ segment having $V_{111}$ structure therein.

As another synthesis method, a $C_{60}$ segment having $n-C_{12}H_{25}$ can be obtained through the same method as the synthesis method of the $C_{60}$ segment 1. Both dialkyl tetraphenylcyclopentadienone (Compound A2) and 1,4-bis (trimethylsilyl)-1,3-butadiene shown in FIG. 9 are used as a starting material. A $C_{59}$ segment having $n-C_{12}H_{25}$ is obtained through sputtering of the obtained $C_{60}$ segment having $n-C_{12}H_{25}$ by use of argon ion. The $C_{59}$ segment having $n-C_{12}H_{25}$, which has the $V_{111}$ structure ($V_{111}$ structured $C_{59}$ segment having $n-C_{12}H_{25}$), is obtained through hydrogen addition to the $C_{59}$ segment having $n-C_{12}H_{25}$ (See FIG. 10).

A small graphene flake is synthesized through the method as shown in references (Nature, 466, 470-473 (2010); Nature, 531, 489-493 (2016); Acc. Chem. Res., 41, 511-520 (2008)). According to these references, first, a source material is prepared, and secondly, a golden thin film, which is disposed having an appropriate form in a metal container such as a stainless steel container, or a glass container. The graphene flake is synthesized through a heat treatment that increases a temperature after introduction of a material such as 10, 10'-dibromo-9,9'-bi anthracene on the surface of the golden film. For example, 10, 10'-dibromo-9,9'-bi anthracene can be obtained by polymerizing a starting material of 9,10-dibromo-anthracene (product of Sigma-Aldrich Japan Co., Ltd) with heating almost at 200° C. A polymer having the graphene structure is obtained by treating the obtained 10, 10'-dibromo-9,9'-bi anthracene almost at 400° C.

Polymer having the $V_{111}$ structure can be obtained through the sputtering by use of argon ion and the subsequent hydrogen addition in the same way as the above mentioned synthesis method (See FIG. 11). The hydrogen storage material having the $V_{111}$ structure can be obtained by treating the powder nanographene or the small single layer graphene flake, which is obtained through the above method, by use of an apparatus which enables sputtering and hydrogen addition, A $C_{131}$ segment having the V111 structure can be obtained by treating a $C_{132}$ segment through sputtering by use of argon ion and the subsequent hydrogen addition in the same way as the above mentioned two synthesis methods. The $C_{132}$ segment is synthesized by using a starting dendrimer material shown in FIG. 12.

Secondly, a thin film graphite or a compound having a multi layered graphene structure is obtained, without using catalyst, through a thermal decomposition using a crystalline molecule (molecular crystal). The atomic vacancy is produced by sputtering after mechanically cutting and/or peeling the thin film graphite or the multi layered, and after this production, the hydrogen storage material having $V_{111}$ structure can be synthesized by being exposed in an atomic (or a molecular) hydrogen.

For example, a thin film graphite or a graphene group having a multi layered graphene structure is obtained by making carbon material or graphene material through a heat treatment in which polymerized hydrocarbon such as crystalline film polyimide is heated at the temperature range from 1000° C. to 1500° C., and again, is heated at the temperature range from 2500° C. to 3200° C. (reference 4: Tanso in Japanese, 251, 2-10 (2012), reference 5: Carbon 30, 255-262 (1992), reference 6: Manufacturing & Technology in Japanese, 66, 88-91 (2014)).

The obtained sample is peeled on a silicon oxide, or is cut and/or peeled by use of a mechanical method, for example, and a graphene face is fabricated through these processes. After fabrication of the graphene face, an atomic vacancy is produced by a sputtering method so as to activate the graphene face, and continuously, is exposed in atomic (or molecular) hydrogen. And, a hydrogen storage material having the $V_{111}$ structure can be synthesized.

Thirdly, a compound having the nanographene structure can be obtained by a detonation method controlling a starting material and a reaction condition. This method is Suitable to a mass production.

Fourthly, graphene or graphite is obtained through a method using chemical vapor deposition (CVD) in which hydrocarbon gas as a raw material is supplied and heated on a metal substrate having catalytic effect, and graphene is synthesized on the substrate.

At this time, a small single layer graphene flake can be synthesized by using a single crystal substrate having a face of high Miller index. Photoelectron spectroscopy and high-resolution electron energy loss spectroscopy clarify that a characteristic electronic structure of graphene is lost generally by a strong interaction between this nanographene ribbon and the substrate. A small single layer graphene flake maintaining characteristics of graphene can be synthesized by a method in which a metal substrate is decoupled with a small single layer graphene flake by a migration between the substrate and the graphene flake through introduction of chemical species of low molecular weight. Also, the small single layer graphene flake maintaining characteristics of graphene can be synthesized by separating the graphene flake from the substrate and by transcribing to another substrate under a mechanical effect of a bubble. The bubble is obtained by generating a gas such as hydrogen between the substrate face and the graphene flake face by a dip in an alkaline solution and a further electrolysis.

Typically, a metal single crystal or a metal compound such as TiC, which is expected to have catalytic effect toward decomposition reaction of an organic molecule because of a contribution of a d electron, is cut in a direction of high index face. And again, the metal single crystal or the metal compound is heated as a temperature from 1000 to 2000° C. in an ultra-high vacuum from $1\times10^{-7}$ to $1\times10^{-9}$ Pa, and after the heating, an ion sputtering is conducted by introducing an inert gas of pressure from $1\times10^{-3}$ to $1\times10^{-5}$ Pa. The surface of the graphene flake is cleaned by repeating this process and the surface structure is observed by low-energy electron diffraction.

When a cleaned surface having a well-defined high index such as TiC (410) by use of the process, a stair-like surface structure, which a terrace having an order of a few nm (a flat part) and a step (level difference part) appear repeatedly, can be produced. The small single layer graphene flake whose width is the same as the terrace width is synthesized by heating the stair-like surface structure controlled in an atomic level of a few nm order at a temperature from 800 to 1500° C. under introduction of hydrocarbon molecules such as ethylene gas in a pressure from $1\times10^{-3}$ to $1\times10^{-6}$ Pa. According to this method, a small single layer graphene flake having a width controlled in a 1-nm order by changing a face index of used substrate.

Fifthly, nanographene can be obtained by being changed from nanodiamond produced by the detonation method, which is a nanoparticle consisting of a core part having a diamond structure of almost 5 mm, and a shell part whose surface has an amorphous carbon-like structure. A condition with a high temperature and a high pressure, which is generated in the detonation in the stainless steel closed container, generates a growth of the diamond structure in a very short limited time, and a nanoparticle of diamond (nanodiamond) having a relatively uniform particle size distribution is obtained.

Diamond originally has a thermodynamically unstable structure in a phase diagram of carbon alone in a condition of the room temperature and the atmospheric pressure, and also, easily makes structural relaxation which is derived from a characteristically large surface area of the nanoparticle. Because of this, diamond is relaxed to graphene structure, which is stable in a condition of the room temperature and an atmospheric pressure, by a heating or an irradiation of a particle beam such as an electron beam.

Nitrogen atom, which is derived from nitro group included in a gunpowder used for the detonation method, exists in a diamond lattice as a defect, and also, an impurity such as iron included in a structural material of a detonation container exists in amorphous carbon at a nanodiamond surface or between the nanodiamond particles. These existences are thought to contribute in converting nanodiamond to nanographene.

Typically, nanographene having a size of several nm can easily be synthesized by heating nanodiamond in a vacuum or in an inert gas atmosphere such as argon at a temperature from 1300 to 1700° C. Also, a graphene sample in a highly dispersible condition can be obtained by the following procedure. That is, a precursor of nanodiamond is dispersed in isopropanol and then, electrophoretic deposition (EPD) is conducted with a voltage application from 1 to 10 V and a deposition time from 10 to 100 seconds. Also, heating is conducted after a deposition on a heat-resistant substrate such as graphite substrate. At the deposition, isopropanol of 100 ml can be added by an additive such as iodine of 1 to 10 mg, acetone of 1 to 10 ml, or water.

Sixthly, graphite or nanographene is obtained from activated carbon fibers (ACFs). Activated carbon fibers are activated carbons which are obtained by carbonizing and activating fibrous resins and the like. Basic structures of activated carbon fibers have nanographene structures. A structure having several layered nanographene is called nanographite domain. A structure of ACFs depends on a synthesis method or treatment method, but ACFs have a structure in which nanographite consisting of nanaographene having a size of almost several nm constitutes a three dimensional random network. Nanospace having almost the same size as nanographite exists among nanographite, and thus, ACFs has features that they have a very large specific surface area (maximum value is around 3000 m$^2$/g) compared with ordinary activated carbon and most of their constituent carbon atoms nanographite expose on their surfaces.

ACFs are synthesized using a precursor such as cellulose, polyacrylonitrile, phenolic resin, and pitch. A precursor for cellulose type ACFs is viscose rayon, a precursor for polyacrylonitrile type ACFs is acrylic fiber, and a precursor for phenolic type ACFs is phenolic resin fiber obtained through a process in which melt-spun novolak is stiffened using formaldehyde with acidic catalyst. When these precursors are oxidized by heating at a temperature from 200 to 300° C. in an acidic gas atmosphere such as air, precursors become insolubilized by a molecular structure change through cyclization reaction. The insolubilized materials are carbonized by heating at a temperature from 600 to 1300° C. in an inert gas, and then, are activated by heating at a temperature from 700 to 1000° C. in an atmosphere such as water vapor. ACFs are synthesized through these activation processes.

A pitch type ACFs is synthesized, a pitch having high melting point, whose component ratio of liquid crystal is increased to 55-65% by heating oil pitch in a more advanced degree compared with a general pitch, is used as a precursor. This pitch having high melting point is melted and spun by a method such as injection. The obtained spinning is insolubilized by heating at a temperature from 150 to 400° C. in an acidic gas atmosphere, and then, is carbonized by heating at a temperature from 800 to 1200° C. in an inert gas atmosphere. The carbonized pitch is activated by heating in an atmosphere such as water vapor. ACFs are synthesized through these processes.

Graphene is a material as described above. The analog of graphene includes graphite like material, carbon nanotube, several kinds of fullerene, and the like. The graphite like material has a honeycomb structure of graphene in its molecule as suitable surface area. In the process (a2), these materials are set and a partial gas pressure is controlled to be from $0.5\times10^{-1}$ to $0.5\times10^{2}$ Pa. Hereinafter, this pressure range is "vacuum" in this disclosure. This gas pressure range is decided by the reason that high generation efficiency of an atomic vacancy is obtained because process (a2) is conducted in advance of process (a3) in which a vacancy having a single-atom vacancy is induced by an ion beam. Also, this gas pressure range is decided by considering a manufacturing method in which an apparatus such as a 2-pole DC glow discharge sputtering apparatus and a magnetron sputtering apparatus is used in process (a3) explained later. The partial gas pressure in process (a2) is defined for mixed gas molecules, and is not for single hydrogen gas.

In process (a3), hydrocarbon compound have a desired atomic vacancy structure is produced by an ion beam irradiation to the hydrocarbon compound and by a subsequent annealing of the hydrocarbon compound. It is preferable that the ion beam is generated by ionization of a chemically inert gas because the ion beam can change characteristics of a material, basically maintaining a structure of a carbon-based material. Also, it is preferable that an inert gas ion beam such as an Argon ion beam, a Helium ion beam, a Krypton ion beam, and a Xenon ion beam is used because the atomic vacancy is generated effectively and the ion beam provides low cost.

It is preferable that an ion beam having an energy from 80 to 110 eV is irradiated at an irradiation time from 2 to 5 seconds in that a desired atomic vacancy structure is produced. The irradiation produces the desired atomic vacancy structure.

It is preferable that the annealing is conducted at a temperature from almost 550° C. to almost 600° C. in the aspect of process efficiency. It is further preferable that the annealing is conducted almost at 600° C.

In process (a4), it is preferable that hydrogen in the container is activated by use of an arc-shaped filament having the temperature from almost 2000 to 2400° C. because this activation can generate an atomic hydrogen having enough concentration to hydrogenate the atomic vacancy structure. It is preferable that the filament is made of tungsten, molybdenum, or tantalum in the aspect of high thermal releasing function of hydrogen and safety of processing work. A filament made of nichrome or iron chromium is not suitable for a heating at 2000° C. or higher. Hydrogen is not thought to be released at lower than 2000° C. for the most case.

In process (a5), a hydrogenation treatment is conducted by exposing the hydrocarbon having atomic deficiency to hydrogen which is activated at a temperature from almost 800° C. to 1000° C. by use of the arc-shaped filament. The exposing time ranges almost 5 to 10 minutes. It is necessary to have a hydrogen partial pressure ranged from 0.5 to $2 \times 10^{-2}$ Pa in the container so as to produce a well isolated $V_{111}$ structure. Because of the hydrogenation treatment, an atomic hydrogen or a molecular hydrogen can be introduced to the atomic vacancy structure produced by the above mention process, and also, the carbon-based hydrogen storage material according to the present invention, which has autocatalysis and the $V_{111}$ structure, can be manufactured.

When the autocatalysis structure is recovered in a final reaction state of the cycled catalytic reaction, hydrogen adsorption and/or release is shown to occur in a multi-step thereby. At the same time, when hydrogen adsorption and/or release with at least four molecules per an atomic vacancy happens, a hydrogen releasing accompanied by an exothermic reaction is predicted not to occur within the reaction of $V+3H_2 \leftrightarrow V_{222}$ only.

There is a theory simulation which can prove with adequate reproducibility that any energy on each autocatalytic reaction path along the multi-step does not become infinite for a stable structure of the compound consisting of the carbon-based material. Accordingly, it is possible to identify the autocatalytic reaction condition in the presence of hydrogen molecule when an existence of the specified structure is identified actually in the catalytic process.

3. Hydrogen Storage Method and Releasing Method Using the Carbon-Based Hydrogen Storage Material Next, the carbon-based hydrogen storage material adsorbed by hydrogen according to the present invention is put in the container, receives a hydrogen adsorption of $0.5 \times 10^{-3}$ to 15 MPa. When a pressure for hydrogen adsorption is increased, larger amount of hydrogen can be adsorbed to the carbon-based hydrogen storage material according to the present invention.

The adsorbed hydrogen can be released by heating the carbon-based hydrogen storage material adsorbed by hydrogen according to the present invention. The heating temperature ranges from $5 \times 10^{2}$° C. to $1.5 \times 10^{3}$° C. and the heating time ranges from $0.5 \times 10^{-9}$ to $0.8 \times 10^{4}$ seconds. As explained above, the carbon-based hydrogen storage material according to the present invention has a small activation barrier and exhibits little exothermic reaction in releasing hydrogen, and thus, adsorbed hydrogen can be released safely and efficiently, being controlled its releasing volume per unit of time.

4. Hydrogen Storage Device Using the Carbon-Based Hydrogen Storage Material

Figure 13:
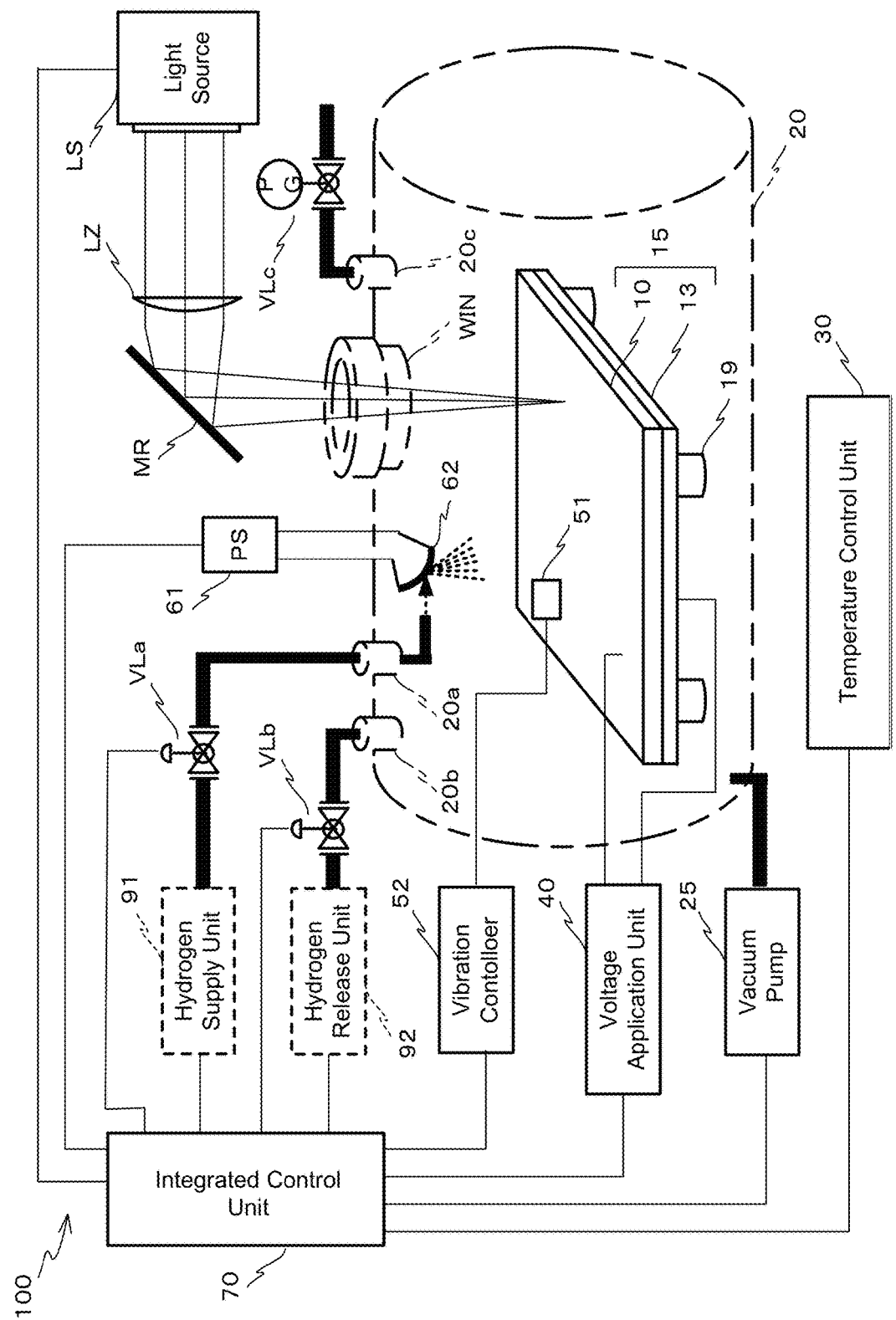
FIG. 13 is the schematic figure showing the hydrogen storage device utilizing the hydrogen storage material of the present invention.

FIG. 13 shows a structure of a hydrogen storage device according to one embodiment. As shown in FIG. 13, the hydrogen storage device 100 according to one embodiment comprises (i) a plate type member 15 including a hydrogen storage member 10 consisting of the carbon-based hydrogen storage material obtained by the above mentioned method, and a substrate member 13 consisting of substrate material, (ii) a container 20 and a vacuum pump 25, (iii) a pressure control device including a hydrogen supply valve VLa and a hydrogen outlet valve VLb, and (iv) a temperature control device 30. Also, the hydrogen storage member 100 comprises (v) a voltage applying device 40, (vi) a vibration device including a vibrator 51 and a vibration control part 52, and (vii) a light irradiation device including a light source LS, a condenser lens LZ, and a mirror MR. Furthermore, the hydrogen storage member 100 comprises (viii) an atomization promoting device including a DC power supply 61 and a tungsten filament 62, and (ix) an integrated control unit 70.

The container 20 includes a hydrogen supply port 20a, a hydrogen outlet port 20b, an emergency outlet port 20c. Also, the container 20 includes a light irradiation window WIN.

The container 20 can build a sealed internal space in a condition that a plate type member 15 is accommodated therein. The plate type member 15 is set to be fixed to a holding member 19 which is fixed to an inside of the container 20.

In this embodiment, the substrate member 13 consists of material such as low-activity metal, graphite and alumina. The plate type member 15 consisting of both the substrate member 13, and the hydrogen storage member 10 placed on the substrate member 13 is disposed in the container 20.

The substrate member 13 can be omitted, and a pellet-type hydrogen storage member 10, which is obtained by molding a powdery sample, can only be disposed in the container 20.

The hydrogen supply port 20a is connected to the hydrogen supply valve VLa through a first hydrogen supply pipe member. The hydrogen supply valve VLa is connected to a hydrogen supply device 91 through a second hydrogen supply pipe member. The hydrogen supply device 91 changes a hydrogen supply pressure according to a control of the integrated control unit 70. The hydrogen supply valve VLa controls a volume of hydrogen, which is supplied from the hydrogen supply device 91 to the container 20; according to a control of the integrated control unit 70.

The hydrogen outlet port 20b is connected to the hydrogen outlet valve VLb through a first hydrogen outlet pipe member. The hydrogen outlet valve VLb is connected to a hydrogen outlet device 92 through a second hydrogen supply pipe member. The hydrogen outlet device 92 changes a hydrogen outlet pressure according to a control of the integrated control unit 70. The hydrogen outlet valve VLb controls a volume of hydrogen, which is emitted from the container 20 to the hydrogen outlet device 92, according to a control of the integrated control unit 70.

A pressure control device, which deals with a hydrogen pressure, is composed of a control function part provided for the hydrogen supply valve VLa, the hydrogen supply device 91, the hydrogen outlet valve VLb and the hydrogen outlet device 92 in the hydrogen supply valve VLa, the hydrogen outlet valve VLb the integrated control unit 70.

A mass spectrometer can be used as an apparatus to verify that hydrogen is involved in an emitted gas from the hydrogen storage member 10. This apparatus can be provided in another chamber in which an emitted gas is guided and can be detached therefrom by use of a gate valve. Another function can be furnished to separate hydrogen, which is involved in the emitted gas, through a palladium film or a palladium pipe and lead to another chamber.

The emergency outlet port 20c is connected a safety valve VLc through a first emergency outlet pipe member. The safety valve VLc is in an open state when a pressure in the container 20, which is investigated by use of a pressure gauge (PG), exceeds a predetermined value. The air derived via the safety valve VLc is emitted into the outside, which keeps safe even when hydrogen is emitted therein, through a second emergency outlet pipe member.

The integrated control unit 70 can get pressure data in the container 20 which is investigated by use of a pressure gauge (PG), and refer the data when controlling of the pressure in the container 20.

In this embodiment, the hydrogen storage device 100 further comprises a vacuum pump 25. The inside of the container 20 can maintain a highly vacuum environment in a dry condition by using the vacuum pump 25 under a control of the integrated control unit 70.

A pump such as a turbo molecular pump, an ion pump, or a titanium pump is used the vacuum pump 25.

The temperature control device 30 has heating function and cooling function. The temperature control device 30 controls a temperature in the container 20 according to the control of the integrated control unit 70. A thermometer can be provided in the container 20, and the temperature control device 30 can refer the measurement result by the thermometer when controlling the temperature therewith. The temperature control device 30 can report the measurement result by the thermometer to the integrated control unit 70, and then, the integrated control unit 70 can refer the result when controlling the temperature control device 30.

The DC power supply 61 controls an electric current flowing in the tungsten filament 62 according to the control of the integrated control unit 70. When the electric current flows in the tungsten filament 62, the tungsten filament 62 is heated. When the hydrogen gas derived via the hydrogen supply port 20a and a third hydrogen supply pipe member is irradiated to the tungsten filament 62, hydrogen atomization (activation) is promoted and then hydrogen is irradiated toward the hydrogen storage member 10.

By using the hydrogen storage device 100, hydrogen is stored in the hydrogen storage member 10 by the procedure in which the pressure control device conducts pressurization control, and also, the temperature control device 30 controls the temperature in the container 20, hydrogen atmosphere being kept in the container 20. As listed in Table 1, since the activation barrier of the carbon-based hydrogen storage material according to the present invention is estimated to be almost 1.3 eV, hydrogen is adsorbed stably at room temperature and is never released from hydrogen storage member 10. Therefore, hydrogen generated as a by-product in a factory such as an oil refining factory, for example, can be stored in the hydrogen storage device, and can be transported or carried to a prescribed place safely.

When hydrogen, which is stored in the hydrogen storage member 10 accommodated in the container 20, is released, the following procedure is preferably conducted so as to ensure safety. At first, the container is heated by the temperature control device 30 in atmospheric pressure, and then, hydrogen adsorbed in the hydrogen storage member 10 is released. After a start of hydrogen release, a speed of hydrogen release is controlled by conducting temperature control through temperature control device 30.

Hydrogen release from the hydrogen storage device 100 according to the present invention notably increases even at a temperature of 100° C. Thus, a heat source with general purpose can be used as a temperature control device. A designated device needs not to be prepared. Hydrogen stored in the above mentioned device can be released safely in the transported or carried place by conducting temperature control and pressure control as described above.

The hydrogen storage device 100 further comprises a voltage applying device 40 which applies voltage between the two sides of the plate type member 15. The voltage applying device 40 can reverse a polarity of the applied voltage, which preferably presents an appropriate control of storage and release of hydrogen. For example, when a gate voltage is applied with minus polarity, hydrogen storage in the hydrogen storage member 10 is promoted. When a gate voltage is applied with plus polarity, hydrogen release from the hydrogen storage member 10 is promoted.

In this disclosure, "a gate voltage with minus polarity" means that a hole is injected into the carbon-based hydrogen storage material by providing a gate electrode with relatively minus polarity. The gate electrode is positioned at a back face of the substrate member contrary to the carbon-based hydrogen storage material. Also, "a gate voltage with plus polarity" means that an electron is injected into the carbon-based hydrogen storage material by providing a gate electrode with relatively plus polarity. For "a gate voltage with plus polarity", the gate electrode is also positioned at a back face of the substrate member contrary to the carbon-based hydrogen storage material.

The voltage applying device 40 is electrically connected with the plate type member 15 by wiring members provided at a wall of the container 20.

The hydrogen storage device 100 further comprises a vibration device vibrating the plate type member 15. The vibration device includes a vibrator 51 and a vibration control part 52. The vibrator 51 is provided on a face of the hydrogen storage member 10 in the plate type member 15. The vibrator 51 is vibrated according to a vibration control signal supplied from the vibration control part 52. The vibration control part 52 operates according to the control of the integrated control unit 70. The vibrator 51 includes a device such as an SAW oscillator, a crystal oscillator, and a ceramic resonator. It is further preferable that a laser light excitation ultrasonic generator is used as the vibrator 51.

The vibration control part 52 is electrically connected with the vibrator 51 by wiring members provided at a wall of the container 20.

The hydrogen storage device 100 further comprises a light irradiation device which irradiates a light for external field to a face of the hydrogen storage member 10 in the plate type member 15. Through the light irradiation device, selective hydrogen release reaction is promoted by resonant local vibrational excitation which suppresses generation of temperature increase in the entire device.

As described above, the light irradiation device includes a light source LS, a condenser lens LZ, and a mirror MR. A light source LS irradiates light according to the integrated control unit 70. It is preferable that light is one selected from a group consisting of infrared light, terahertz light, visible light, ultraviolet light, and laser light, which accelerates hydrogen release. It is further preferable that light is infrared light or terahertz light, which has a higher acceleration of hydrogen release.

Light from the light source LS is irradiated through the condenser lens LZ, and is reflected by the mirror MR. Light reflected by the mirror MR is irradiated the surface of the hydrogen storage member 10 through the light irradiation window WIN.

By using the hydrogen storage device 100 composed as mentioned above, hydrogen can be effectively stored and be stored and exported safely.

In the hydrogen storage device 100, when voltage application by the voltage applying device 40 and light irradiation by the light irradiation are conducted, material for the substrate member 13 is semiconductor material. To the contrary, when neither voltage application by the voltage applying device 40 nor light irradiation by the light irradiation are conducted and vibration by the vibration device is conducted, material for the substrate member 13 is either one of metal, insulator, glass, and the like.

When neither voltage application by the voltage applying device 40 nor light irradiation by the light irradiation nor vibration by the vibration device are conducted, material for the substrate member 13 can be mesh metal plate, and the hydrogen storage member 10 is provided on the mesh metal plate (or sandwiched by the mesh metal plate). Also, when the substrate member 13 consists of silicon substrate having oxidation processing and the like, and the hydrogen storage member 10 is provided on the silicon substrate by a means such as electrostatic attraction. When the substrate member 13 is activated to general carbon material, the substrate member 13 consists of solid sample and the hydrogen storage member 10 is provided on the sample such as metal, insulator and glass which have small deterioration reactivity. To prepare for accidentally rapid reaction progress the substrate member 13 is preferably metal material in the aspect of durability and processability.

In the hydrogen storage device 100, a reaction route of heat activated type is applied at autocatalytic reaction. Increase of reaction activity accompanied molecular vibration or lattice vibration through external stimulation except temperature. An origin of external stimulation except temperature is, for example, an electromagnetic wave, an ultrasonic wave, an electron wave (an electron beam), and several kinds of particle beams.

Examples of molecular vibration or lattice vibration through external stimulation except temperature is (i) molecular vibration or lattice vibration coherently excited by an electromagnetic field having infrared wavelength, (ii) molecular vibration or lattice vibration excited by local electronic excitation of an electromagnetic having wavelengths from visible to ultraviolet, (iii) molecular vibration or lattice vibration excited by introduction of ultrasonic wave, or (iv) molecular vibration or lattice vibration excited as a results of irradiations of an electron beam or a particle beam. Excitation of molecular vibration or lattice vibration, which is directly connected to a chemical reaction by specifying a local mode, can increase reaction activity effectively compared with a thermal excitation.

Vibration excitation of hydrogen molecule itself, vibration excitation of atomic structure in the $V_{111}$ structure, and vibration excitation at a graphene surface, are related to these vibration excitations when adsorbing of hydrogen. Vibration excitation of atomic structure in the $V_{221}$ structure, and vibration excitation at a graphene surface are related to these vibration excitations when releasing of hydrogen.

Figure 14:
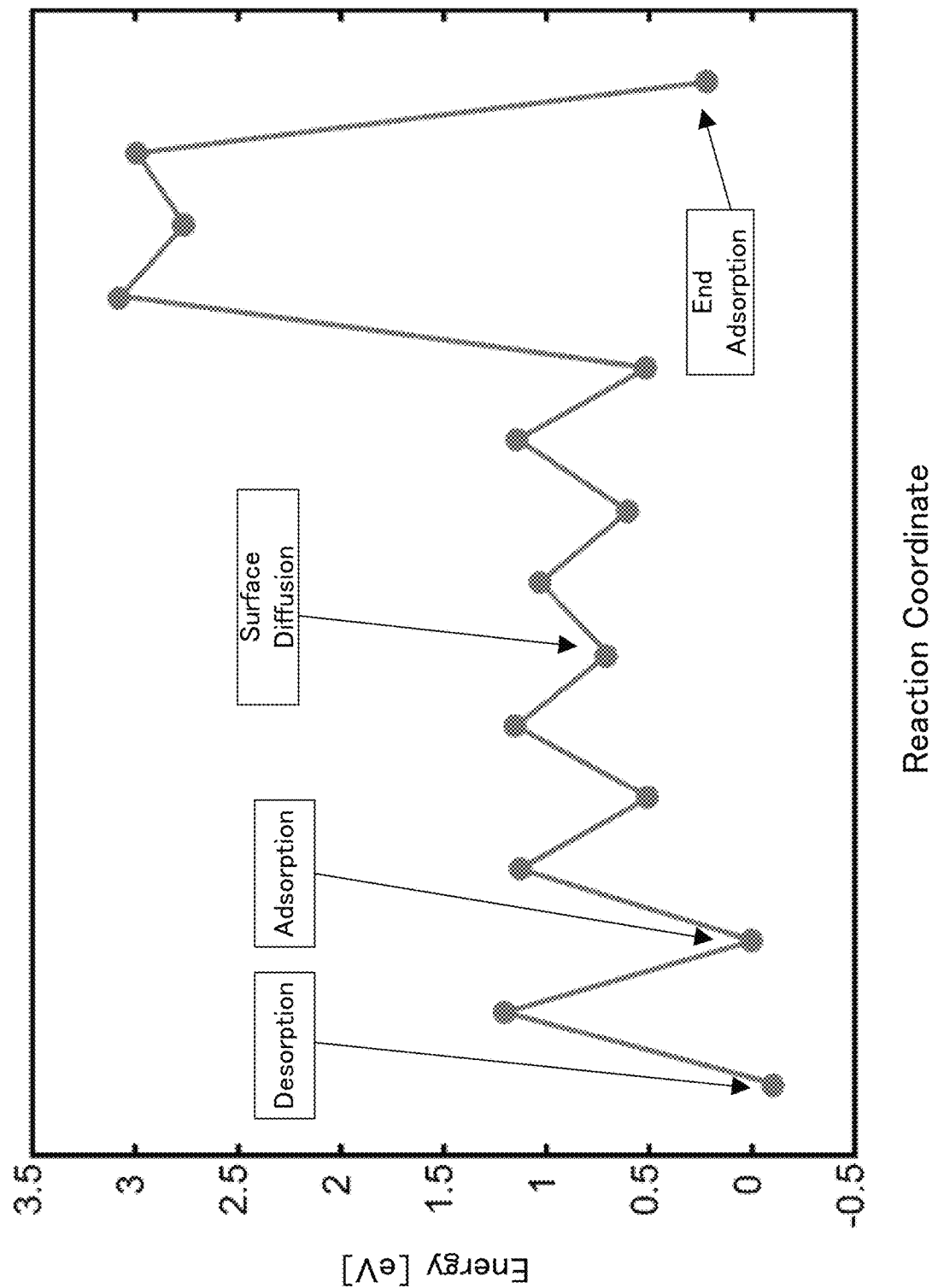
FIG. 14 is the schematic figure showing changes of a reaction coordinate and energy, when hydrogen is dissociated, adsorbed from the hydrogen storage material of the present invention, and diffused on surface thereof.

Interatomic bonds of hydrogen molecule are selectively cleaved by irradiating electromagnetic waves having wavelengths from visible to ultraviolet which is above mentioned in (ii). This irradiation increases reaction activity when adsorbing hydrogen molecule gas. The similar effect can be obtained by a method using a surface of metal catalyst which converts hydrogen molecule to atomic hydrogen in advance and by a method using an electron beam or a particle beam which has an effect of releasing molecule in a gas phase FIG. 14 is a view schematically showing an energy diagram of hydrogen adsorption/release in nanographene VANG. As shown in FIG. 14, an activation barrier, which produces adsorbed molecule from desorbed molecule in gas phase, is 1.3 eV, and the activation barrier producing migration to the surface is rather smaller than 1.3 eV.

This result indicates that adequate temperature and gas partial pressure produces adsorption and surface diffusion of hydrogen molecule. Also, the adsorption condition similar to an on top type adsorption condition on the graphene surface can directly be constituted when atomic hydrogen is induced. When an enough increase of temperature to exceed an energy barrier of around 1.2 eV or smaller, hydrogen molecule in released from the hydrogen absorbed VANG, because energy level of the adsorbed condition is higher than the released condition. There is a possibility that excess hydrogen adsorption to armchair end of relatively stable molecule is not produced by migration. Principle of adsorption and release is thought to be guaranteed by the simulation result.

Reaction which has a single energy barrier leading to production of the $V_{221}$ structure proceed in an initial (or a first) stage which giving hydrogen adsorption to the $V_{111}$ structure. Then, migration process having a plurality of energy barriers generates and release and adsorption with graphene surface as a whole proceeds. At this time, FIG. 14 indicates that needed energy for migration process does not exceed needed energy for reaction in the initial stage, which leads to the conclusion that migration continuingly generates from the initial reaction.

When adsorption comes to be a stable condition by energy dispersion to molecular vibration and the like after progress of adsorption, molecular having adsorption of hydrogen takes a structure having some kind of energy minimum point. At the stage, molecular having adsorption of hydrogen takes a stable structure, and thus, adsorbed hydrogen does not easily return to gas phase. Reaction process, which hydrogen adsorbed on each carbon produces molecular hydrogen and thereby releases in gas phase, hardly occurs when on top adsorption generates in the way like this.

When temperature of hydrogenated VANG in stable hydrogen storage condition is increased, a hydrogen migration exceeding an activation barrier is activated again as a result of thermal vibration. At this time, the local $V_{211}$ structure, one of energy minimum point, is generated. When this structure appears, hydrogen releasing reaction is generated through an activation barrier of around 1.2 eV which is relatively easy to deal with. Barrier just before hydrogen release is a little larger than that needed in hydrogen migration on molecular. From the above result, temperature for generation of release is estimated to range almost from 100 to 250° C., which is temperature range enough to exceed an activation barrier of 1.3 eV, as activation energy needed to release from VANG in hydrogen storing state.

The above explanation theoretically supports that hydrogen storage material according to the present invention is a hydrogen storage hydrocarbon compound consisting of only carbon and hydrogen and has a structure which produces local autocatalytic reaction (hereinafter, this structure may be referred to as "autocatalytic structure").

EXAMPLES

Hereinafter, the present invention will be further described using examples of this invention, but the present invention is not limited to the following examples.

Example 1

Manufacturing of Carbon-Based Hydrogen Storage Material According to the Present Invention Kish graphite or highly oriented pyrolytic graphite (HOPG) was used as carbon-based material having the graphene like structure (graphene material). Commercial material can be used as these graphene materials. The graphene material was set at a sample mounting position in a manufacturing apparatus synthesizing a triply hydrogenated vacancy structure. Commercial apparatus can be used as the manufacturing apparatus.

First, a sample was set into UHV chamber and an Argon ion (Ar$^+$ ion) beam was irradiated to the graphene material by using a argon irradiation apparatus of scanning probe microscopy (SPM, JEOL Ltd.) provided in the manufacturing apparatus synthesizing triply hydrogenated vacancy structure. The ion energy was 100 eV and irradiation times ranged almost from 3 to 4 seconds. By this irradiation, the atomic vacancy was produced at the outermost layer of the sample, and thus, the graphene sample was prepared. Subsequently, the graphene sample was annealed at temperature of 600° C. and excessively adsorbed materials above the atomic vacancy were removed.

The prepared graphene was observed by using a high resolution scanning tunneling microscope (STM) of JSPM-4500S system (JASCO Corporation). The STM was used at a constant current mode and a standard pressure was $6 \times 10^{-9}$ Pa. STM chip was prepared by an electrochemical etching of a tungsten wire and was cleaned by Ar$^+$ ion sputtering. The ion energy ranged from 1.0 to 3.5 keV. The imaging condition was as follows: U=0.1 V and I=0.4 nA. As a result, it was confirmed that an adequately isolated atomic vacancy structure was produced.

After a finish of annealing, atomic hydrogen was generated from hydrogen provided in a container, which included the annealed graphene sample, by using an arc-shaped tungsten wire (model number: W-461327, NiCOLA Inc.). The hydrogen partial pressure in the container was $10^{-2}$ Pa and temperature of the tungsten wire was 2200° C.

Subsequently, the graphene sample was heated in a condition that the temperature of the graphene was 900° C.±100° C., and was exposed with atomic hydrogen for 5-10 minutes, and thus, an activated sample was obtained by hydrogenation of the graphene sample. Moreover, the graphene sample was annealed for 2 hours under a temperature control to be 600° C., and thus, the graphene sample was observed by STM in the similar condition mentioned above. The observation result was shown in FIG. 1B. The Microscope image clarified that the activated sample had an atomic vacancy structure.

Figure 15:
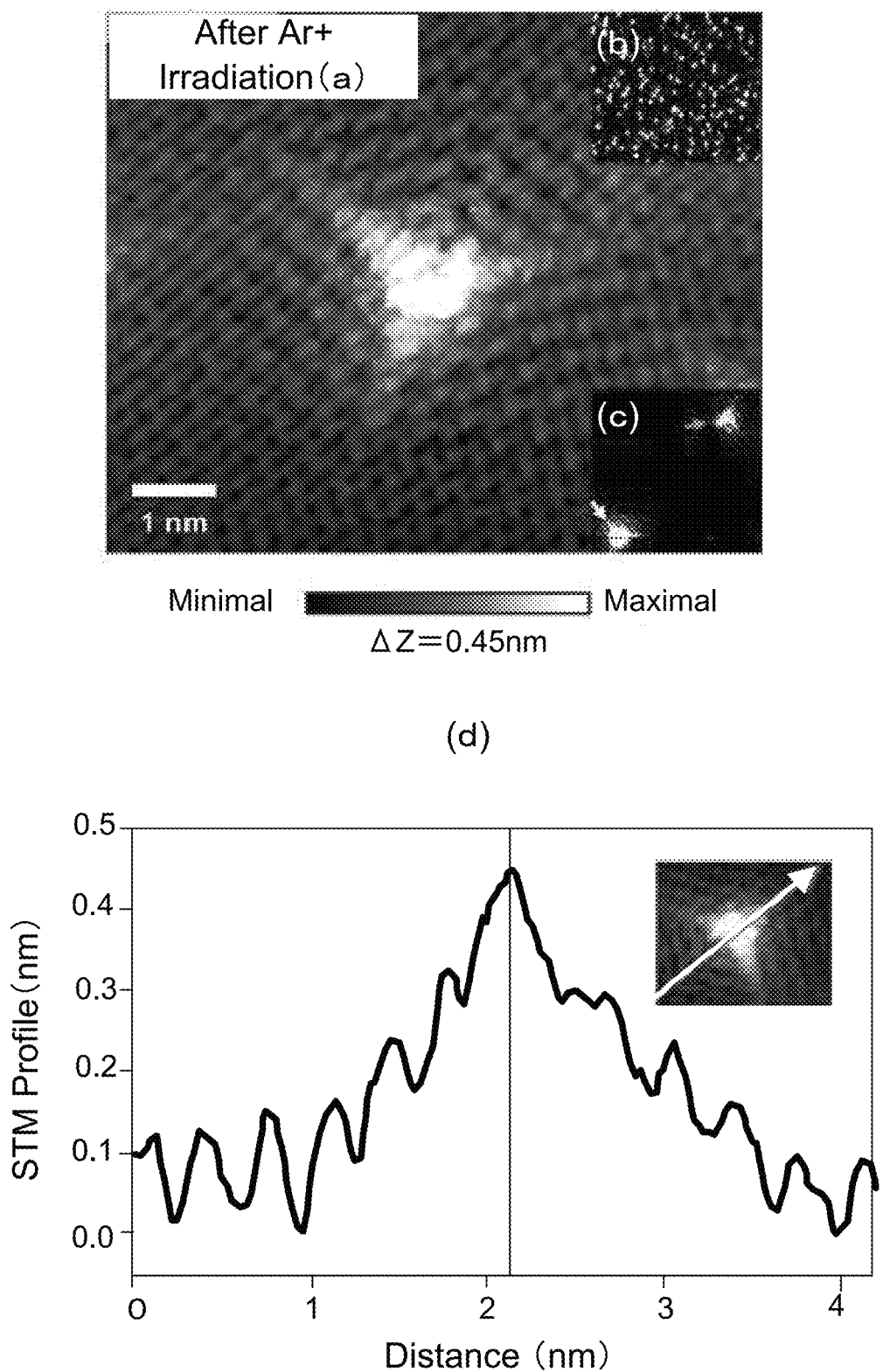
FIG. 15 is a STM image showing typical atomic defect after sputtering. (a) is the STM image showing a typical distribution of the atomic deficiency without passivation, existing in the graphite layer locates at the most outer layer as a protrusion of 3-fold symmetry axis. (b) shows the typical distribution of the atomic deficiency after sputtering. (c) shows a subtype of 2 atomic deficiencies without passivation.
Figure 16:
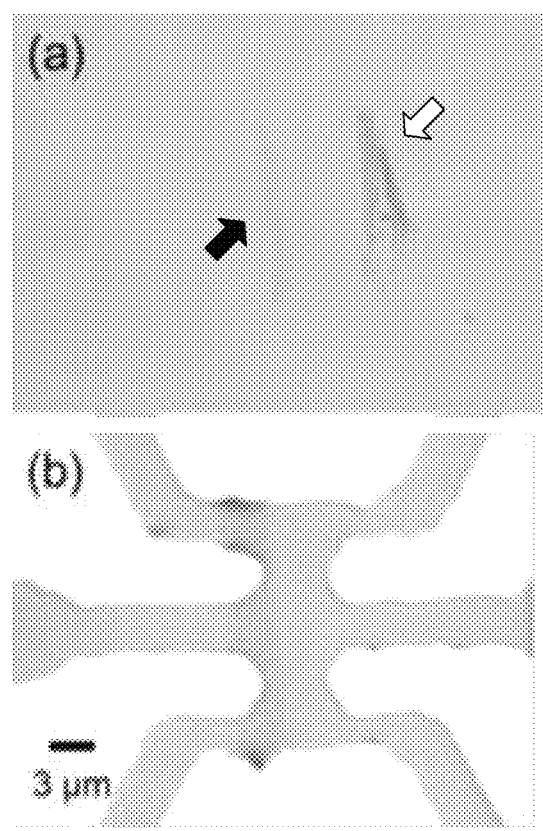
FIG. 16 is an optical image showing an example of the preparation result of a single layer graphene flake. (a) is the optical image of the single layer graphene flake which is formed on Si substrate covered with $SiO_2$ layer having 285 nm as is. (b) is the optical image of the same graphene flake after attaching Au/Cr electrodes by using photolithography.

FIG. 15 is a typical image showing an atomic vacancy after sputtering. An HOPG sample having Bernal (AB) stacking was used when conducting this experiment. First, the sample was put into the UHV chamber, and the atomic vacancy was produced at the outermost layer of the sample by irradiating of Ar$^+$ ion of 100 eV. The irradiation time ranged from 3 to 4 seconds. Subsequently, excessively adsorbed materials above the atomic vacancy were removed by annealing at 600° C. in the similar condition mentioned above. The STM experiment was conducted at a constant current mode and a standard pressure was $6 \times 10^{-9}$ Pa in the similar condition mentioned above. The JSPM-4500S system (JASCO Corporation) was used at room temperature under the UHV condition. STM chip was prepared by an electrochemical etching of a tungsten wire and was cleaned by Ar$^+$ ion sputtering. The ion energy ranged from 1.0 to 3.5 keV. The imaging condition was as follows: U=0.1 V and I=0.4 nA. FIG. 15D is a view showing STM topology graph line profile crossing a non-passivated atomic vacancy. This profile confirmed that deficiency structure was produced by irradiation of Ar$^+$ ion.

Subsequently, at a surface of graphite, hydrogen molecule was deconstructed by using an arc-shaped tungsten filament having filament temperature of 2200° C., thereby generating hydrogen atom. The generated hydrogen atom was exposed in the UHV condition. Hydrogen whole pressure in the UHV chamber was $10^{-2}$ Pa by using a leak valve technology. Sample temperature was kept to be 900° C.±100° C. Exposing time ranged from 5 to 10 minutes and a distance between the sample surface and the filament ranged from 5 to 10 mm. In this condition, an on top type adsorption structure was produced over the entire region of graphene structure at the sample surface.

In the above condition, an atomic vacancy was produced. When exposing time was increased, or a distance between the sample and filament was decreased in addition to an increasing of the exposing time, a typical atomic vacancy (pit having a nano size) was observed to be produced (Refer to FIGS. 15A, 15B and 15C).

After hydrogenating of this sample, an annealing was conducted again at a temperature of 600° C. under the UHV condition. The same STM image as that in FIG. 1B was obtained when the STM observation was conducted as room temperature by using several of these samples. It was confirmed that releasing reaction proceeded by annealing, and that releasing of another adsorbed hydrogen was produced, thereby leaving only the triply hydrogenated vacancy.

Example 2

Figure 8:
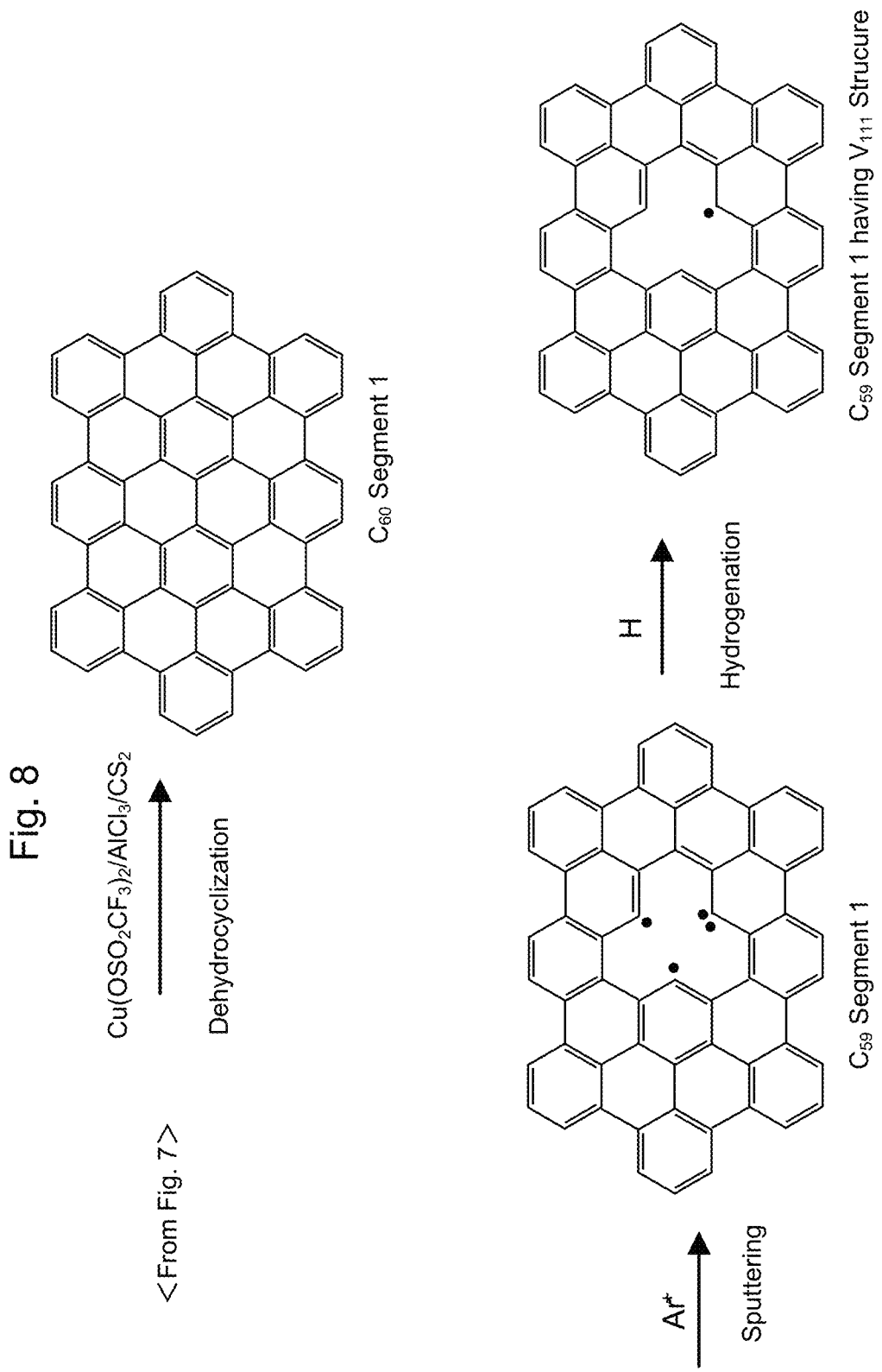
FIG. 8 shows the second half of the synthesis process of $C_{59}$ segment having $V_{111}$ structure therein.

Consideration of Physical Properties of Activated Samples (1) Preparation of a Small Single Layer Graphene Flake A graphene flake, which was prepared from graphene material, was provided on a Si substrate surface covered by a SiO$_2$ layer, and thus, a single layer graphene flake having a width of 3 micrometers by micro-mechanical peeling (Refer to FIG. 8).

FIG. 16A is an optical microscopic image of a single layer graphene flake with it produced on a Si substrate surface covered by a SiO$_2$ layer having a thickness of 285 nm. It was shown that the single layer graphene flake (shown by a black arrow in the figure) was positioned at a center of the image with a thicker flake (shown by a white arrow in the figure). FIG. 16B is an image showing an optical microscopic image of the single layer graphene flake having an Au/Cr electrode.

The single layer graphene flake in FIG. 16A was manufactured to have the electrode by photolithography method. The sample having a thickness of less than 5 nm was directly contacted by Cr adhesion layer, and then, Au was deposited on the Cr layer.

(2) Fabrication of FET

Figure 17:
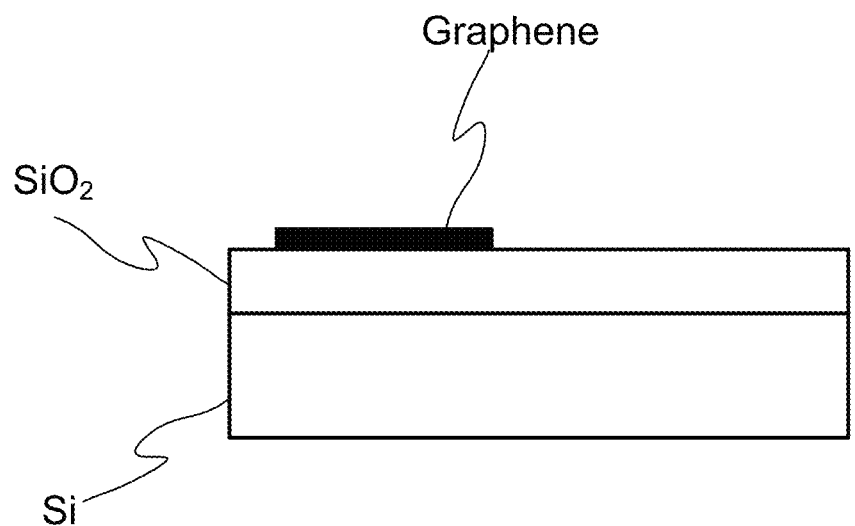
FIG. 17 is the schematic figure showing a cross section of the structure, which is the patterned graphene at a nanoribbon shape, placed on the substrate.
Figure 18:
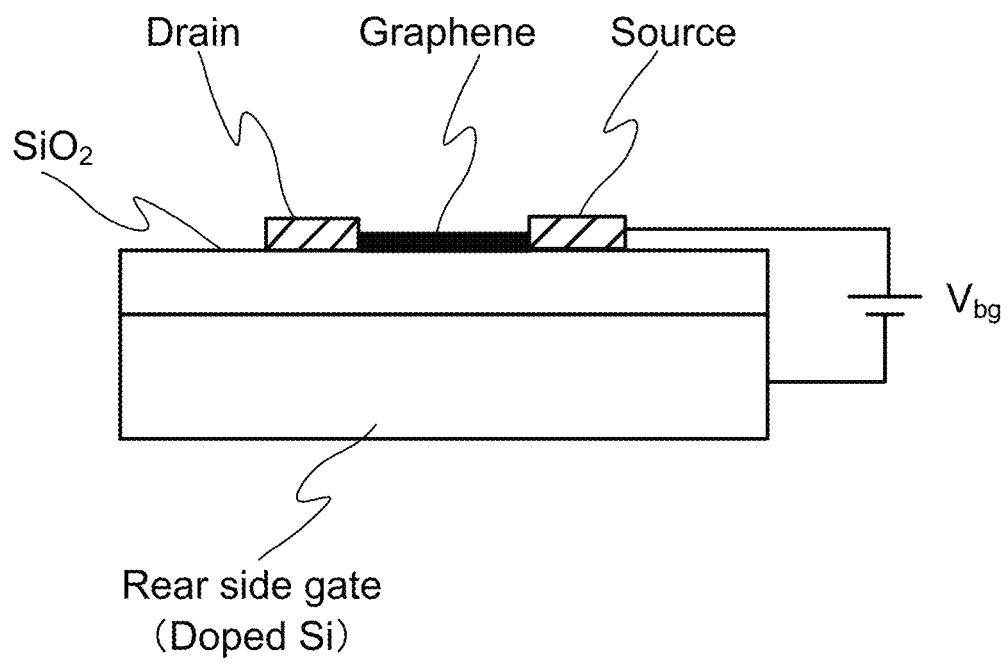
FIG. 18 is the schematic figure showing the cross section of a field-effect transistor (FET).

Silicon oxide ($SiO_2$ layer) produced on n type doped Si was prepared when fabricating FET. A microfabrication was applied to the single layer graphene fabricated on the substrate, thereby conducting any patterning thereon. The graphene having any patterning, which was isolated by micro-mechanical peeling, was prepared as structural material after setting on the $SiO_2$/doped-Si substrate. Then, metal electrodes (source and drain) were provided on graphene by lithography method and field-effect transistor (FET) was finally fabricated. FIG. 17 is a cross-sectional view schematically illustrating the structural material of an embodiment. FIG. 18 is a cross-sectional view schematically illustrating FET of an embodiment.

The doped-Si had a large amount of doping, and because of this, had conductivity. Accordingly, the doped-Si was used as a back side gate. The FET enabled a control of Fermi energy of graphene as a capacitor by applying back side gate voltage $V_{bg}$.

(3) Measurement of Physical Properties of FET

Figure 19:
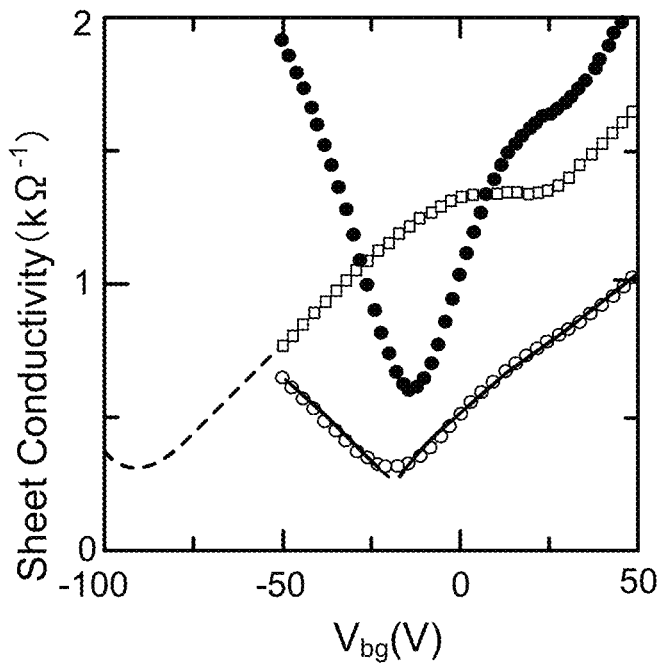
FIG. 19 shows $V_{bg}$ dependency of graphene sample (No. 1).

FIG. 19 is $V_{bg}$ dependence of graphene sample measured at room temperature. Black dots are data of an initial sample. Outlined circles are data measured after $Ar^+$ ion irradiation of 100 eV for 5 minutes. Outlined squares are data after being exposed in atomic hydrogen for 5 minutes. Atomic hydrogen was produced by a introduction of hydrogen gas at $1 \times 10^{-5}$ Pa and heating with a tungsten filament.

Figure 20:
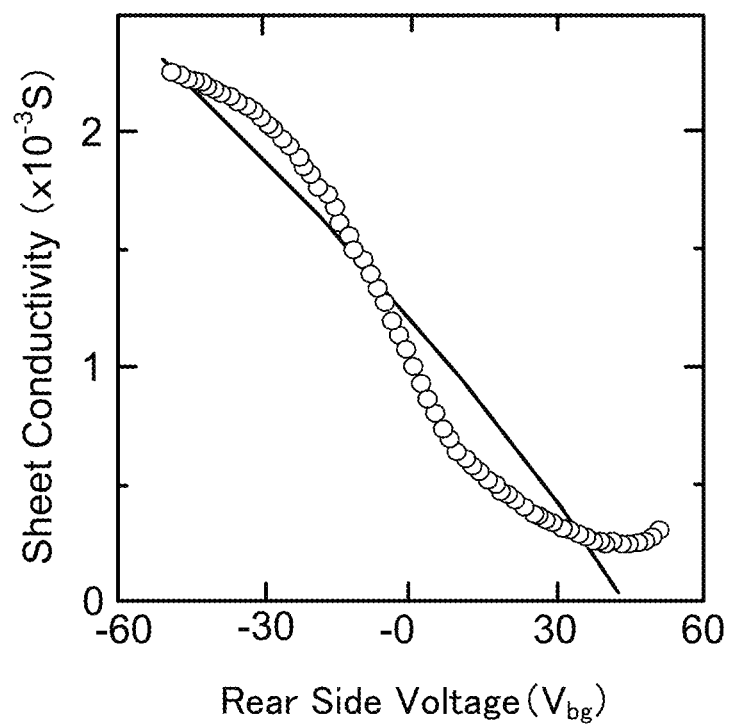
FIG. 20 shows $V_{bg}$ dependency of graphene sample (No. 2).

FIG. 20 is $V_{bg}$ dependence of graphene sample irradiated by $Ar^+$ ion. From a result that the dependency was theoretically fitted, density of atomic vacancies $n_d$ was estimated to be almost $9 \times 10^{12}$ $cm^{-2}$. Production of atomic vacancies drastically varied the back side gate voltage dependency. A point which the back side gate voltage dependency shows minimum conductivity gives a charge neutrality point ($V_{CNP}$).

From the result in FIG. 19, large change of the charge neutrality point ($V_{CNP}$) was observed as a result of production of hydrogen adsorption as follows. The $V_{CNP}$ value of the initial sample was almost –13 V, but that of the sample irradiated by an $Ar^+$ beam was almost –19 V. This change was considered to be caused by a removal of contamination remained by $Ar^-$ irradiation. By a subsequent exposure to hydrogen atom, $V_{CNP}$ became outside scanning range (from –50 to +50V) of the back side gate voltage. This $V_{CNP}$ shift to a minus direction corresponded to generation of electron donation to graphene sample by adsorption of atomic hydrogen.

Electron mobility was almost equal to that of $Ar^+$ irradiation sample by estimating a slope of the graph in the back side gate voltage range from –50 V to 0 V. Trace mobility of both samples were almost $2.0 \times 10^3$ $cm^2$ $V^{-1}$ $s^{-1}$.

Subsequently, graphene sample prepared by $Ar^+$ irradiation was exposed in hydrogen molecule for several exposing times in $1.0 \times 10^{-6}$ Pa. The back side gate voltage $V_{bg}$ was applied during exposure. Right after gate voltage turning off and hydrogen emission, conductivity of a sample was measured by changing a combination of back side gate voltage $V_{bg}$ and exposure time.

Figure 21:
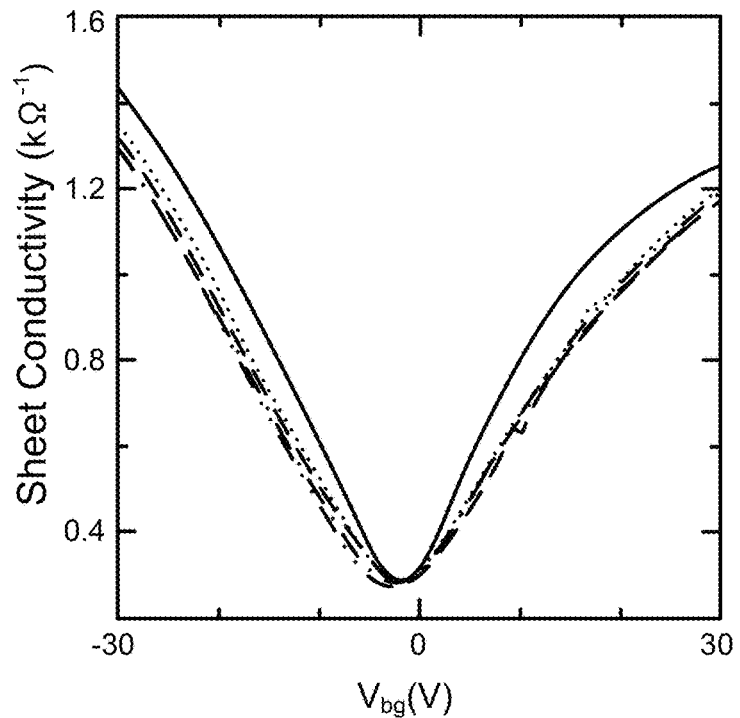
FIG. 21 shows conductivity of a back-side voltage dependency, when the initial graphene is exposed at $V_{bg}$=+30 V, and then it is exposed to hydrogen for 5 minutes, 10 minutes, 15 minutes, or 30 minutes.

FIG. 21 is back side gate voltage dependency of conductivity when being exposed in hydrogen molecule for $V_{bg}$=+30 V. A solid line indicates the results having no irradiation, a dotted line indicates the results having irradiation time of 5 minutes, a broken line indicates the results having irradiation time of 10 minutes, a dot-dash line indicates the results having irradiation time of 15 minutes, and a two-dot chain line indicates the results having irradiation time of 30 minutes.

Figure 22:
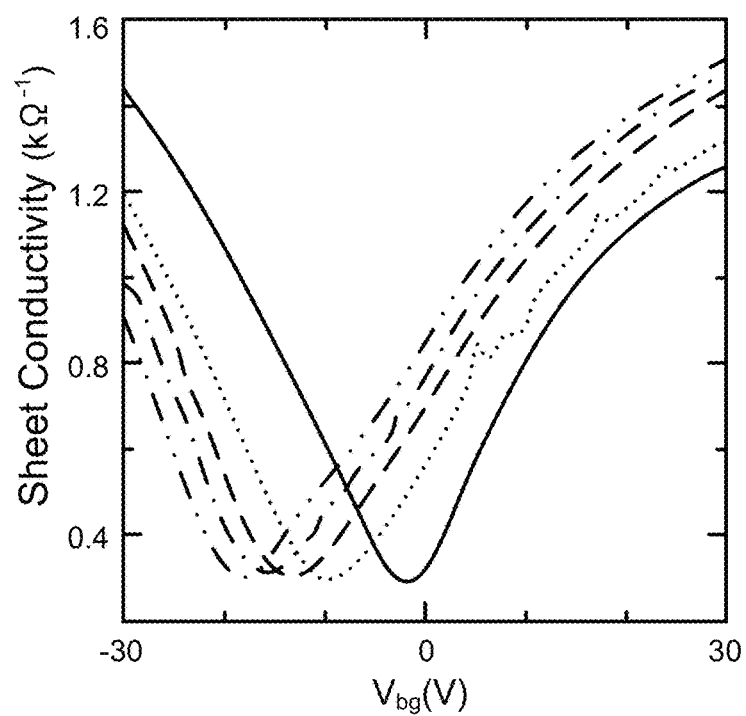
FIG. 22 shows conductivity of the back-side voltage dependency, when the initial graphene is exposed at $V_{bg}$=−30 V, and then it is exposed to hydrogen for 5 minutes, 10 minutes, 15 minutes, or 30 minutes.

FIG. 22 is back side gate voltage dependency of conductivity for $V_{bg}$=+30 V. In FIG. 22, except for back side gate voltage of –30 V, the same sample as that in FIG. 21 was treated by the same procedure as that in FIG. 21. Results in FIG. 22 indicated definitive differences compared with those in FIG. 21. When the sample was doped in a condition of $V_{bg}>V_{CNP}$, the charge neutrality point $V_{CNP}$ did not shift (Refer to FIG. 21). To the contrary, when the sample was hole doped in a condition of $V_{bg}>V_{CNP}$, the charge neutrality point $V_{CNP}$ significantly shifted to a minus direction, corresponding to electron donation to the sample (Refer to FIG. 22).

Repeated measurements of conductivity clarified that the charge neutrality point $V_{CNP}$ returned to an original position. This result indicated that electron donation naturally disappeared. Interestingly, observed electron donation was contrary to the case of hole donation by oxygen molecule, which causes hole donation. It was clarified that hole donation by oxygen was induced by a condition of $V_{bg}>V_{CNP}$, and that hole donation by oxygen molecule was suppressed by a condition of $V_{bg}>V_{CNP}$. These results were contrary to the case of exposure in hydrogen molecule. Also, hole donation exposure in oxygen molecule does not naturally disappear in the same way that an untreated sample generally exhibits hole doped characteristics in the aspect of conductivity From the results mentioned above, It was indicated that electrical characteristics of graphene having atomic vacancies according to the present invention changed through hydrogenation treatment.

(4) Evaluation of Maximum Volume of Hydrogen Adsorption and Release Volume

The on top type hydrogen adsorption structure is produced when atomic hydrogen is adsorbed in the above mentioned sample. One of the on top type hydrogen adsorption structure is produced per two carbon atoms which appear in the graphene structure. Density of adsorbed hydrogen $n_H$ is almost $2 \times 10^{15}$ $cm^{-2}$. It was confirmed that almost 99% of adsorbed hydrogen could be released except for a little hydrogen remaining in the triply hydrogenated vacancy structure when annealing temperature of 600° C. is kept for $0.8 \times 10^4$ seconds, because density of atomic vacancies $n_d$ is almost $9 \times 10^{12}$ $cm^{-2}$.

Hereinbefore, various embodiments have been described, but various modification examples can be employed without limitation to the above-described embodiments. The present invention is useful in energy field, and is especially useful in hydrogen storage and production of hydrogen circulation infrastructure centered at hydrogen storage.

REFERENCE SIGNS LIST

10: Hydrogen storage member
13: Substrate member
15: Plate type member
19: Holding member
20: Container
20a: Hydrogen supply port
20b: Hydrogen outlet port
20c: Emergency outlet port
25: Vacuum pump
30: Temperature control device
40: Voltage applying device 51: Vibrator
52: Vibration control part
61: DC power supply
62: Tungsten filament
70: Integrated control unit
91: Hydrogen supply device
92: Hydrogen outlet device
LS: Light source
LZ: Condenser lens
MR: Mirror
VLa: Hydrogen supply valve
VLb: Hydrogen outlet valve
VLc: Safety valve
WIN: Window

The invention claimed is:

1. A carbon-based hydrogen storage material with a triply hydrogenated vacancy ($V_{111}$) structure as a catalytic capability point for adsorbing a hydrogen molecule and dissociated hydrogens therefrom as autocatalysis,
wherein the hydrogen storage material is a hydrocarbon compound which produces a non-endothermic release or an exothermic release of hydrogen adsorbed in the compound,
wherein the hydrogen storage material is manufactured by a method comprising the steps of:
preparing a hydrocarbon compound as a raw material of the carbon-based hydrogen storage material;
setting the raw material in a container having a gas at a partial pressure from $0.5 \times 10^{-7}$ to $0.5 \times 10^2$ Pa, wherein the gas has reaction activity with the hydrocarbon compound;
producing the hydrocarbon compound having an atomic vacancy by ion beam irradiation of the hydrocarbon compound, and performing an annealing treatment for 2 to 5 seconds at a temperature from 550 to 650° C.;
activating the hydrogen molecules in the container using an arc-shaped filament producing a temperature from 2000 to 2400° C.;
exposing the hydrocarbon compound having an atomic vacancy to the activated hydrogen from 5 to 10 seconds at a temperature from 800 to 1000° C.,
wherein the hydrocarbon compound adsorbs the hydrogen molecule at a pressure from $0.5 \times 10^{-3}$ to 15 MPa, thereby producing the hydrogen storage material.

2. The carbon-based hydrogen storage material according to claim 1,
wherein the hydrogen storage hydrocarbon compound consists of carbon and hydrogen.

3. The carbon-based hydrogen storage material according to claim 1, wherein the hydrogen storage hydrocarbon compound is a graphene or a nanographene.

4. The carbon-based hydrogen storage material according to claim 3, wherein the graphene or the nanographene is selected from the group consisting of: a $C_{59}$ segment, a $C_{59}$ segment having an alkyl group, and a $C_{131}$ segment.

5. The carbon-based hydrogen storage material according to claim 1, wherein a releasing adsorption activation barrier of the hydrogen storage hydrocarbon compound is smaller than 2 eV.

6. The carbon-based hydrogen storage material according to claim 5, wherein the releasing adsorption activation barrier of the hydrogen storage hydrocarbon compound is 1.3 eV or smaller.

7. The carbon-based hydrogen storage material according to claim 1, wherein the hydrogen storage hydrocarbon compound releases and/or adsorbs more than two hydrogen molecules per catalytic capability point.

8. A method of manufacturing a carbon-based hydrogen storage material with a triply hydrogenated vacancy ($V_{111}$) structure as a catalytic capability point for adsorbing a hydrogen molecule and dissociated hydrogens therefrom as autocatalysis, comprising the steps of:
preparing a hydrocarbon compound as a raw material of the carbon-based hydrogen storage material;
setting the raw material in a container having a gas with a partial pressure from $0.5 \times 10^{-7}$ to $0.5 \times 10^2$ Pa, wherein the gas has reaction activity with the hydrocarbon compound;
producing the hydrocarbon compound having an atomic vacancy by ion beam irradiation of the hydrocarbon compound, and performing an annealing treatment for 2 to 5 seconds at a temperature from 550 to 650° C.;
activating hydrogen molecules in the container using an arc-shaped filament having the temperature from 2000 to 2400° C.; and
exposing the hydrocarbon compound having an atomic vacancy to the activated hydrogen for 5 to 10 seconds at a temperature from 800 to 1000° C.,
wherein the hydrocarbon compound adsorbs the hydrogen molecule at a pressure from $0.5 \times 10^{-3}$ to 15 MPa, thereby producing the carbon-based hydrogen storage material; and
wherein the carbon-based hydrogen storage material is a hydrocarbon compound which produces a non-endothermic release or an exothermic release of hydrogen adsorbed in the compound.

9. The method according to claim 8, wherein the hydrocarbon compound is graphene or its analog.

10. The method according to claim 8,
wherein the ion beam is selected from the group consisting of: an Argon ion beam, a Helium ion beam, a Krypton ion beam, and a Xenon ion beam.

11. The method according to claim 10,
wherein the Argon ion beam is irradiated, thus having an irradiation time from 2 to 5 seconds at an irradiation power from 80 to 110 eV.

12. A method of storing hydrogen, comprising storing hydrogen to the carbon-based hydrogen storage material according to claim 1 at a pressure from $0.5 \times 10^{-3}$ to 15 MPa.

13. A method of releasing hydrogen from a carbon-based hydrogen storage material, comprising heating the carbon-based hydrogen storage material having a $V_{111}$ structure as a catalytic capability point for adsorbing a hydrogen molecule and dissociated hydrogens therefrom as autocatalysis, wherein the hydrogen storage material is a hydrocarbon compound which produces a non-endothermic release or an exothermic release of hydrogen adsorbed in the compound for releasing hydrogen at a pressure from $0.5 \times 10^{-3}$ to 15 MPa, the heating time being from $0.5 \times 10^{-9}$ to $0.5 \times 10^3$ seconds at a temperature from $0.5 \times 10^2$ to $0.5 \times 10^3$° C.

14. A hydrogen storage device comprising:
a container including: a hydrogen storage element constituted by the carbon-based hydrogen storage material having a $V_{111}$ structure as a catalytic capability point for adsorbing a hydrogen molecule and dissociated hydrogens therefrom as autocatalysis, wherein the hydrogen storage material is a hydrocarbon compound which produces a non-endothermic release or an exothermic release of hydrogen adsorbed in the compound and a hydrogen supply/outlet port, forming a sealed internal space in a condition that the hydrogen storage element is accommodated;
a pressure control device controlling a pressure in the container; and a temperature control device controlling a temperature in the container, wherein the hydrogen supply/outlet port has a safety valve.

15. The hydrogen storage device according to claim 14, wherein hydrogen is stored in the hydrogen storage element through a temperature control of the container by the temperature control device in addition to a pressurization control by the pressure control device.

16. The hydrogen storage device according to claim 14, wherein the pressure control device gives an atmospheric pressure in the container, and in addition, a heating controlling of an inside of the container starts a release of hydrogen adsorbed in the hydrogen storage device, and after the start of the release, the temperature control device controls a temperature of the inside of the container and also controls a speed of releasing hydrogen adsorbed in the carbon-based hydrogen storage material.

17. The hydrogen storage device according to claim 14, further comprising a voltage applying device applying a voltage to both sides of a plate type member consisting of the carbon-based hydrogen storage material and substrate material, wherein the voltage applying device can reverse the polarity of the applied voltage.

18. The hydrogen storage device according to claim 17, further comprising a vibration device vibrating the plate type member.

19. The hydrogen storage device according to claim 18, further comprising a lighting device accelerating the hydrogen release by irradiating the plate type member, wherein the plate type member is selected from the group consisting of: an electromagnetic wave, an ultrasonic wave, and a particle beam.

* * * * *